United States Patent
Samuelsson et al.

(10) Patent No.: US 12,309,428 B2
(45) Date of Patent: May 20, 2025

(54) SYSTEMS AND METHODS FOR SIGNALING PICTURE OUTPUT RESOLUTION IN VIDEO CODING

(71) Applicant: Sharp Kabushiki Kaisha, Sakai (JP)

(72) Inventors: Jonatan Samuelsson, Vancouver, WA (US); Sachin G. Deshpande, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 131 days.

(21) Appl. No.: 17/785,450

(22) PCT Filed: Dec. 14, 2020

(86) PCT No.: PCT/JP2020/046604
§ 371 (c)(1),
(2) Date: Jun. 15, 2022

(87) PCT Pub. No.: WO2021/125145
PCT Pub. Date: Jun. 24, 2021

(65) Prior Publication Data
US 2023/0040376 A1     Feb. 9, 2023

Related U.S. Application Data

(60) Provisional application No. 62/949,864, filed on Dec. 18, 2019.

(51) Int. Cl.
H04N 19/70    (2014.01)
H04N 19/172   (2014.01)
H04N 19/46    (2014.01)

(52) U.S. Cl.
CPC .......... *H04N 19/70* (2014.11); *H04N 19/172* (2014.11); *H04N 19/46* (2014.11)

(58) Field of Classification Search
CPC ...... H04N 19/70; H04N 19/172; H04N 19/46; H04N 19/59; H04N 21/440263
See application file for complete search history.

(56) References Cited

U.S. PATENT DOCUMENTS

2021/0051341 A1* 2/2021 Seregin .................. H04N 19/70
2021/0092416 A1* 3/2021 Choi ..................... H04N 19/172

OTHER PUBLICATIONS

Official Communication issued in International Patent Application No. PCT/JP2020/046604, mailed on Feb. 9, 2021.
(Continued)

*Primary Examiner* — Richard T Torrente
(74) *Attorney, Agent, or Firm* — Keating & Bennett, LLP

(57) ABSTRACT

This disclosure relates to video coding and more particularly to techniques for signaling picture output resolution for coded video. According to an aspect of an invention, a first flag syntax element indicating whether conformance cropping window offset parameters are present in a sequence parameter set is parsed, wherein the conformance cropping window offset parameters specify a cropping window that is applied to pictures with a width equal to a maximum width and a height equal to a maximum height.

3 Claims, 10 Drawing Sheets

(56) References Cited

OTHER PUBLICATIONS

Samuelsson et al., "AHG 8: Adaptive Resolution Change (ARC) High-Level Syntax (HLS)", Joint Video Experts Team (JVET) of ITU-T SG 16 WP 3 and ISO/IEC JTC 1/SC 29/WG 11, JVET-O0204, Jul. 3-12, 2019, pp. 1-6.
Chen et al., "AHG 8: Adaptive Resolution Change", Joint Video Experts Team (JVET) of ITU-T SG 16 WP 3 and ISO/IEC JTC 1/SC 29/WG 11, JVET-O0303-v2, Jul. 3-12, 2019, 9 pages.
Bross et al., "Versatile Video Coding (Draft 7)", Joint Video Experts Team (JVET) of ITU-T SG 16 WP 3 and ISO/IEC ITC 1/SC 29/WG 11, JVET-P2001-vE, Oct. 1-11, 2019, 488 pages.
Bross, "Versatile Video Coding (Draft 1)", Joint Video Experts Team (JVET) of ITU-T SG 16 WP 3 and ISO/IEC JTC 1/SC 29/WG 11, JVET-J1001-v2, Apr. 10-20, 2018, 41 pages.
Segall et al., "Joint Call for Proposals on Video Compression with Capability beyond HEVC", Joint Video Exploration Team (JVET) of ITU-T SG 16 WP 3 and ISO/IEC JTC 1/SC 29/WG 11, JVET-H1002 (v6), Oct. 18-24, 2017, 28 pages.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 51 pages.
Chen et al., "AHG 8:Adaptive Resolution Change", Joint Video Experts Team (JVET) of Itu-T Sg 16 WP 3 and Iso/ Iec Jtc 1/SC 29/WG 11, JVET-O0303, Jul. 3-12, 2019, pp. 1-8.
Chen et al., "AHG8:Adaptive Resolution Change (JVET-O0303)", Broadcom, 2019, pp. 1-13.
Bross et al., "Versatile Video Coding (Draft 5)", Joint Video Experts Team (JVET) of Itu-T Sg 16 WP 3 and Iso/Iec Jtc 1/SC 29/WG 11, JVET-N1001-v7, Mar. 19-27, 2019, 386 pages.

\* cited by examiner

SYSTEMS AND METHODS FOR SIGNALING PICTURE OUTPUT RESOLUTION IN VIDEO CODING

TECHNICAL FIELD

This disclosure relates to video coding and more particularly to techniques for signaling picture output resolution for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10th Meeting of ISO/IEC JTC1/SC29/WG11 16-20 Apr. 2018, San Diego, CA From the multiple descriptions of video coding tools, a resulting initial draft text of a video coding specification is described in "Versatile Video Coding (Draft 1)," 10th Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 7)," 16th Meeting of ISO/IEC JTC1/SC29/WG11 1-11 Oct. 2019, Geneva, CH, document JVET-P2001-vE, which is incorporated by reference herein, and referred to as JVET-P2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding video data, the method comprising: receiving a sequence parameter set; parsing a maximum width syntax element specifying a maximum width of each decoded picture referring to the sequence parameter set; parsing a maximum height syntax element specifying a maximum height of each decoded picture referring to the sequence parameter set; and parsing a first flag syntax element indicating whether conformance cropping window offset parameters are present in the sequence parameter set, wherein the conformance cropping window offset parameters specify a cropping window that is applied to pictures with a width equal to the maximum width and a height equal to the maximum height.

In one example, a method of encoding image data, the method comprising: signaling a sequence parameter set, wherein: the sequence parameter set includes: (i) a maximum width syntax element specifying a maximum width of each decoded picture referring to the sequence parameter set, (ii) a maximum height syntax element specifying a maximum height of each decoded picture referring to the sequence parameter set, and (iii) a first flag syntax element indicating whether conformance cropping window offset parameters are present in the sequence parameter set, and the conformance cropping window offset parameters specify a cropping window that is applied to pictures with a width equal to the maximum width and a height equal to the maximum height.

In one example, a device comprising one or more processors configured to: receive a sequence parameter set; parse a maximum width syntax element specifying a maximum width of each decoded picture referring to the sequence parameter set; parse a maximum height syntax element specifying a maximum height of each decoded picture referring to the sequence parameter set; and parse a first flag syntax element indicating whether conformance cropping window offset parameters are present in the sequence parameter set, wherein the conformance cropping window offset parameters specify a cropping window that is applied to pictures with a width equal to the maximum width and a height equal to the maximum height.

DESCRIPTION OF EMBODIMENTS

Figure 1:
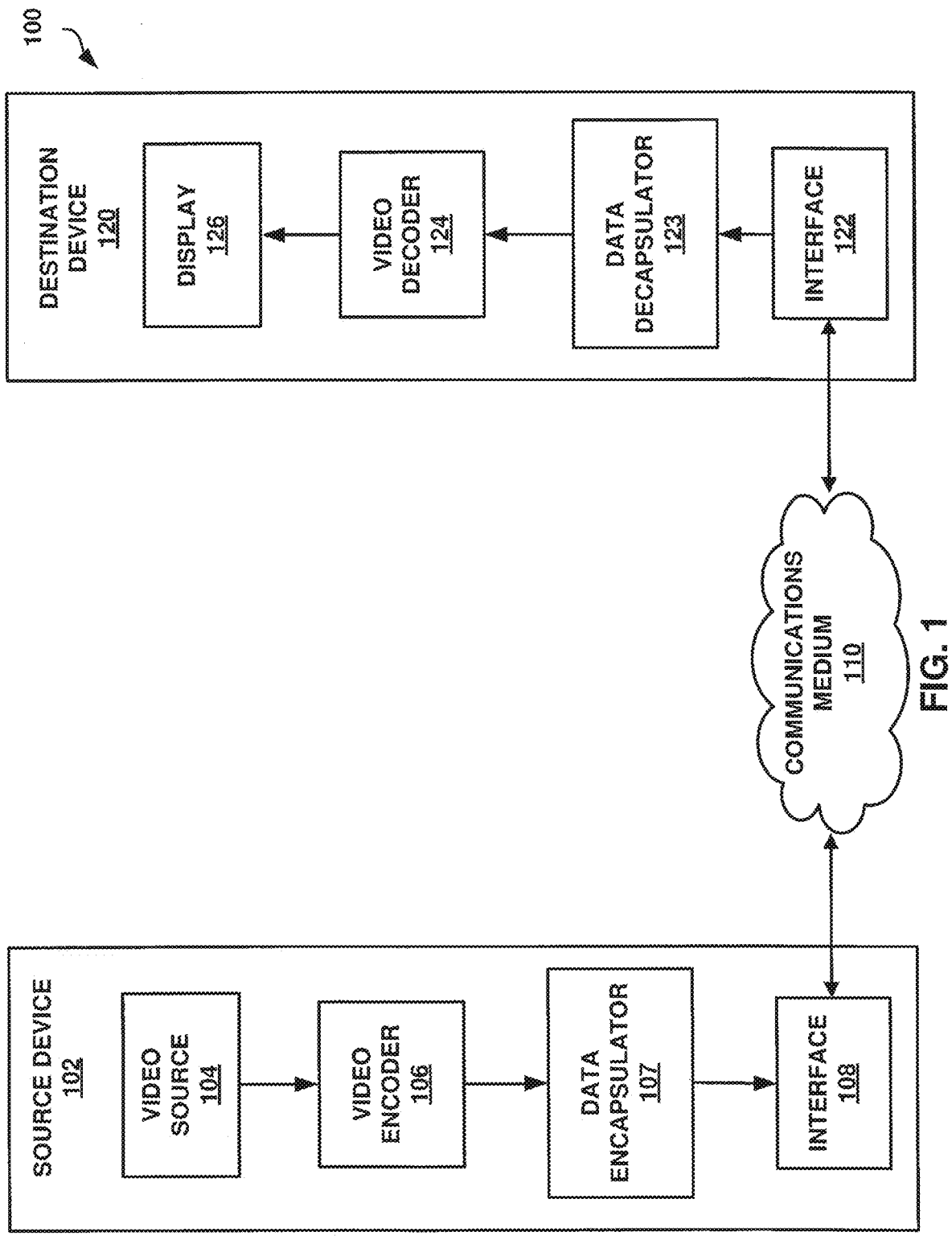
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling picture output resolution video data. It should be noted that although techniques of this disclosure are described with respect to ITU-T H.264, ITU-T H.265, JEM, and JVET-P2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-P2001. Thus, reference to ITU-T H.264, ITU-T H.265, JEM, and/or JVET-P2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling output resolution for video data comprises signaling a syntax element indicating an intended display width of each picture referring to a parameter set and signaling a syntax element indicating an intended display height of each picture referring to the parameter set.

In one example, a device comprises one or more processors configured to signal a syntax element indicating an intended display width of each picture referring to a parameter set and signal a syntax element indicating an intended display height of each picture referring to the parameter set.

In one example, a non-transitory computer-readable storage medium comprises instructions stored thereon that, when executed, cause one or more processors of a device to signal a syntax element indicating an intended display width of each picture referring to a parameter set and signal a syntax element indicating an intended display height of each picture referring to the parameter set.

In one example, an apparatus comprises means for signaling a syntax element indicating an intended display width of each picture referring to a parameter set and means for signaling a syntax element indicating an intended display height of each picture referring to the parameter set.

In one example, a method of decoding video data comprises parsing a syntax element indicating an intended display width of each picture referring to a parameter set and parsing a syntax element indicating an intended display height of each picture referring to the parameter set.

In one example, a device comprises one or more processors configured to parse a syntax element indicating an intended display width of each picture referring to a parameter set and parse a syntax element indicating an intended display height of each picture referring to the parameter set.

In one example, a non-transitory computer-readable storage medium comprises instructions stored thereon that, when executed, cause one or more processors of a device to parse a syntax element indicating an intended display width of each picture referring to a parameter set and parse a syntax element indicating an intended display height of each picture referring to the parameter set.

In one example, an apparatus comprises means for parsing a syntax element indicating an intended display width of each picture referring to a parameter set and means for parsing a syntax element indicating an intended display height of each picture referring to the parameter set.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-P2001, CTUs are partitioned according a quadtree plus multi-type tree (QTMT or QT+MTT) structure. The QTMT in JVET-P2001 is similar to the QTBT in JEM. However, in JVET-P2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-P2001, slices are required to consist of an integer number of complete tiles or an integer number of consecutive complete CTU rows within a tile, instead of only being required to consist of an integer number of CTUs. It should be noted that in JVET-P2001, the slice design does not include slice segments (i.e., no independent/dependent slice segments). Thus, in JVET-P2001, a picture may include a single tile, where the single tile is contained within a single slice or a picture may include multiple tiles where the multiple tiles (or CTU rows thereof) may be contained within one or more slices. In JVET-P2001, the partitioning of a picture into tiles is specified by specifying respective heights for tile rows and respective widths for tile columns. Thus, in JVET-P2001 a tile is a rectangular region of CTUs within a particular tile row and a particular tile column position. Further, it should be noted that JVET-P2001 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL)

units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
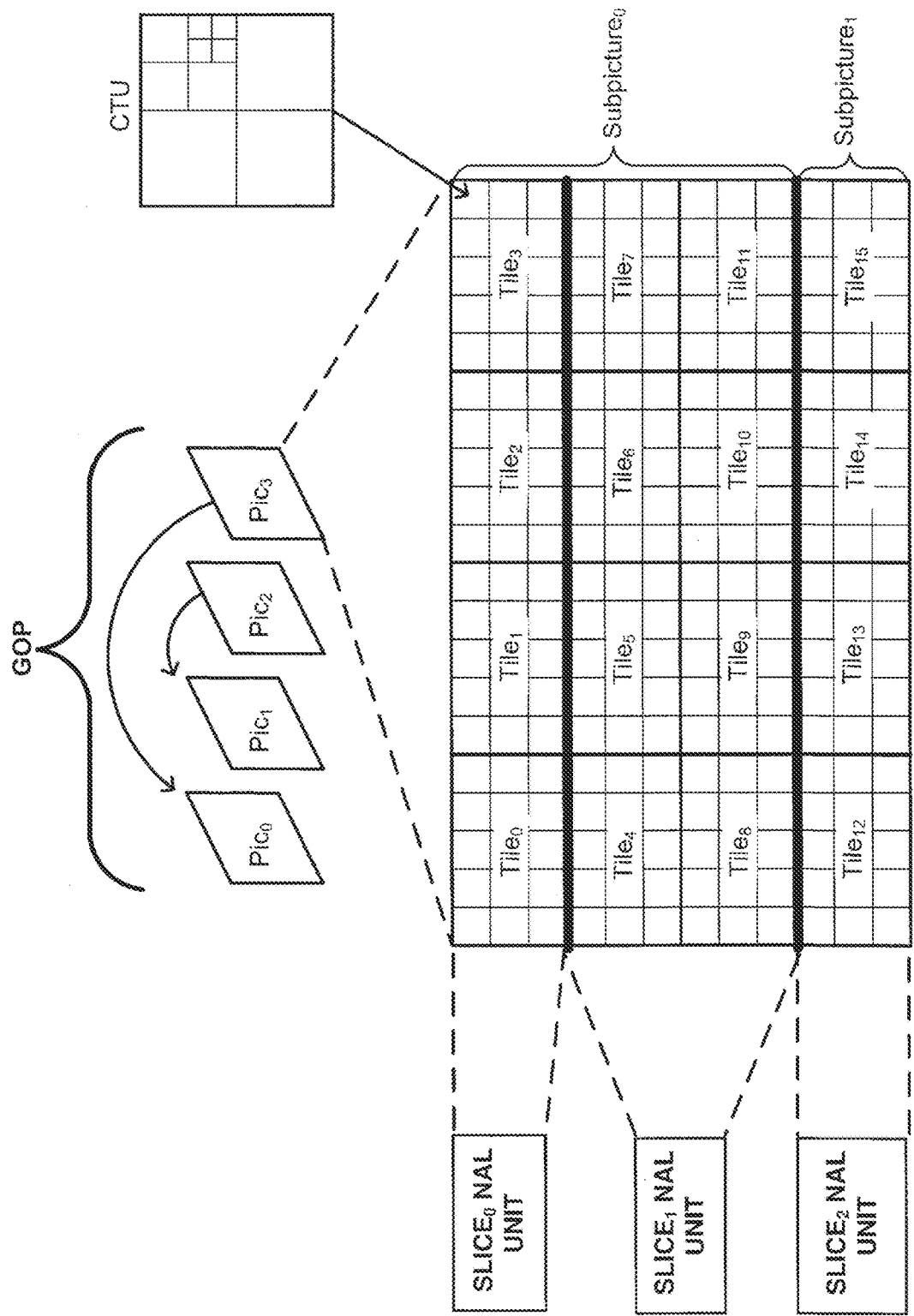
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, subdivisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By using organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed. The encapsulation of slices of a picture into respective NAL unit data structures and sub-bitstream extraction are described in further detail below.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_2$ is illustrated as referencing $Pic_1$. Similarly, $Pic_3$ is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_i$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_i$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-P2001, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.
Further, the following mathematical functions may be used:
Log 2(x) the base-2 logarithm of x;

$$\operatorname{Min}(x, y) = \begin{cases} x; x <= y \\ y; x > y \end{cases};$$

$$\operatorname{Max}(x, y) = \begin{cases} x; x >= y \\ y; x < y \end{cases}$$

Ceil(x) the smallest integer greater than or equal to x.
With respect to the example syntax used herein, the following definitions of logical operators may be applied:
x && y Boolean logical "and" of x and y
x||y Boolean logical "or" of x and y
! Boolean logical "not"
x? y: z If x is TRUE or not equal to 0, evaluates to the value of y; otherwise, evaluates to the value of z.
Further, the following relational operators may be applied:
\> Greater than
\>= Greater than or equal to
< Less than
<= Less than or equal to
== Equal to
!= Not equal to
Further, it should be noted that in the syntax descriptors used herein, the following descriptors may be applied:
b(8): byte having any pattern of bit string (8 bits). The parsing process for this descriptor is specified by the return value of the function read_bits(8).
f(n): fixed-pattern bit string using n bits written (from left to right) with the left bit first. The parsing process for this descriptor is specified by the return value of the function read_bits(n).
se(v): signed integer 0-th order Exp-Golomb-coded syntax element with the left bit first.
tb(v): truncated binary using up to maxVal bits with maxVal defined in the semantics of the syntax element.
tu(v): truncated unary using up to maxVal bits with maxVal defined in the semantics of the syntax element.
u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.
ue(v): unsigned integer 0-th order Exp-Golomb-coded syntax element with the left bit first.

As described above, video content includes video sequences comprised of a series of pictures and each picture may be divided into one or more regions. In JVET-P2001, a coded representation of a picture is referred to as a coded picture and all CTUs of the coded picture are encapsulated in one or more coded slice NAL units. That is, one or more corresponding coded slice NAL units encapsulate a coded representation of a picture. For example, referring again to FIG. 2, the coded representation of $Pic_3$ is encapsulated in three coded slice NAL units (i.e., $Slice_0$ NAL unit, $Slice_1$ NAL unit, and $Slice_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in JVET-P2001, a NAL unit may be a VCL NAL unit or a non-VCL NAL unit. It should be noted that a VCL NAL unit includes slice header data, which provides information used for decoding the particular slice. Thus, in JVET-P2001, information used for decoding video data, which may be referred to as metadata in some cases, is not limited to being included in non-VCL NAL units. JVET-P2001 provides where a picture unit (PU) is a set of NAL units that contain all VCL NAL units of a coded picture and their associated non-VCL NAL units and where an access unit (AU) is a set of NAL units that are associated with each other according to a specified classification rule, are consecutive in decoding order, and contain exactly one coded picture for each present picture unit. A PU consists of one picture header NAL unit, one coded picture, which comprises of one or more VCL NAL units, and zero or more non-VCL NAL units. Thus, in JVET-P2001 an access unit includes one or more coded pictures. In some cases, an access unit may include pictures included in different layers of video. Layers of video are described in further detail below. Further, in JVET-P2001, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a picture unit for each layer in the CVS and the coded picture in each present picture unit is a coded layer video sequence start (CLVSS) picture. In JVET-P2001, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in JVET-P2001, a bitstream may be described as including a sequence of NAL units forming a CVS, where a CVS includes AUs and each AU may include respective pictures for each of a plurality of layers for coded video.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In JVET-P2001, each of a video sequence, a GOP, a picture, a slice, and CTU may be associated with metadata that describes video coding properties. Some types of metadata are encapsulated in non-VCL NAL units. JVET-P2001 defines parameters sets that may be used to describe video data and/or video coding properties. In particular, JVET-P2001 includes the following five types of parameter sets: decoding parameter set (DPS), video parameter set (VPS), sequence parameter set (SPS), picture parameter set (PPS), and adaption parameter set (APS), where a SPS applies to apply to zero or more entire CVSs, a PPS applies to zero or more entire coded pictures, a APS applies to zero or more slices, and a DPS and a VPS may be optionally referenced by a SPS. A PPS applies to an individual coded picture that refers to it. In JVETP2001, a parameter set may be encapsulated as a non-VCL NAL unit and/or may be signaled by other means (e.g., out-of-band transmission). JVET-P2001 also includes a picture header (PH) which is encapsulated as a non-VCL NAL unit. In JVET-P2001, a picture header applies to all slices of a coded picture. JVET-P2001 further enables supplemental enhancement information (SEI) messages to be signaled. In JVET-P2001, SEI messages assist in processes related to decoding, display or other purposes, however, SEI messages are not required for constructing the luma or chroma samples according to a decoding process. In JVET-P2001, SEI messages may be signaled in a bitstream using non-VCL NAL units. Further, SEI messages may be conveyed by some mechanism other than by being present in the bitstream (i.e., signaled out-of-band).

Figure 3:
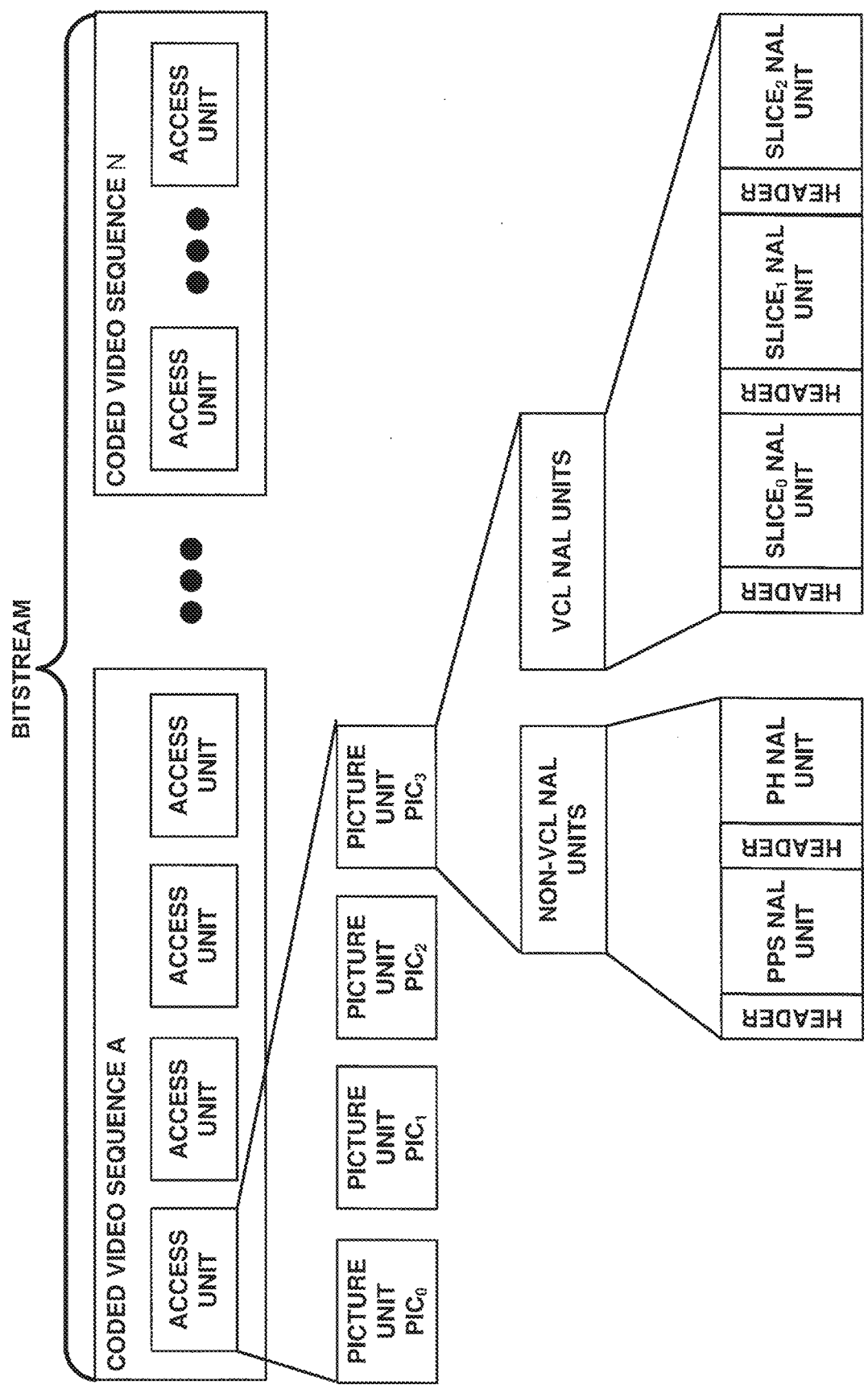
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, $Slice_1$ NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. However, it should be noted that in JVETP2001, the picture header for each picture is required to be in the picture unit corresponding to the picture.

JVET-P2001 defines NAL unit header semantics that specify the type of Raw Byte Sequence Payload (RBSP) data structure included in the NAL unit. Table 1 illustrates the syntax of the NAL unit header provided in JVET-P2001.

TABLE 1

| | Descriptor |
|---|---|
| nal_unit_header( ) { | |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

JVET-P2001 provides the following definitions for the respective syntax elements illustrated in Table 1.
forbidden_zero_bit shall be equal to 0.
nuh_reserved_zero_bit shall be equal to '0'. The value 1 of nub_reserved_zero_bit may be specified in the future by ITU-T ISO/IEC. Decoders shall ignore (i.e. remove from the bitstream and discard) NAL units with nuh_reserved_zero_bit equal to '1'.
nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC.
The value of nuh_layer_id shall be the same for all VCL NAL units of a coded picture.
The value of nuh_layer_id of a coded picture or a PU is the value of the nuh_layer_id of the VCL NAL units of the coded picture or the PU.
The value of nuh_layer_id for non-VCL NAL units is constrained as follows:
  If nal_unit_type is equal to PPS_NUT, PREFIX_APS_NUT, or SUFFIX_APS_NUT, nuh_layer_id shall be equal to the lowest nuh_layer_id value of the coded slice NAL units that refer to the NAL unit.
  Otherwise, if nal_unit_type is equal to SPS_NUT, nuh_layer_id shall be equal to the lowest nuh_layer_id value of the PPS NAL units that refer to the SPS NAL unit.
  Otherwise, if nal_unit_type is equal to AUD_NUT, nuh_layer_id shall be equal to vps_layer_id[0].
  Otherwise, when nal_unit_type is equal to PH_NUT, EOS_NUT, or FD_NUT, nuh_layer_id shall be equal to the nuh_layer_id of associated VCL NAL unit.
NOTE—The value of nuh_layer_id of DPS, VPS, and EOB NAL units is not constrained.
The value of nal_unit_type shall be the same for all pictures of a CVSS AU.
nuh_temporal_id_plus1 minus 1 specifies a temporal identifier for the NAL unit.

The value of nuh_temporal_id_plus1 shall not be equal to 0.

The variable TemporalId is derived as follows:

TemporalId=nuh_temporal_id_plus1−1

When nal_unit_type is in the range of IDR_W_RADL to RSV_IRAP_12, inclusive, TemporalId shall be equal to 0.

When nal_unit_type is equal to STSA_NUT, TemporalId shall not be equal to 0.

The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.

The value of TemporalId for non-VCL NAL units is constrained as follows:

If nal_unit_type is equal to DPS_NUT, VPS_NUT, or SPS_NUT, TemporalId shall be equal to 0 and the TemporalId of the AU containing the NAL unit shall be equal to 0.

Otherwise, if nal_unit_type is equal to PH_NUT, TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SET_NUT, or SUFFIX_SET_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, TemporalId shall be greater than or equal to the TemporalId of the PU containing the NAL unit.

NOTE—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

nal_unit_type specifies the NAL unit type, i.e., the type of RBSP data structure contained in the NAL unit as specified in Table 2.

NAL units that have nal_unit_type in the range of UNSPEC28 . . . UNSPEC31, inclusive, for which semantics are not specified, shall not affect the decoding process specified in this Specification.

NOTE—NAL unit types in the range of UNSPEC_28 . . . UNSPEC_31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream, decoders shall ignore (remove from the bitstream and discard) the contents of all NAL units that use reserved values of nal_unit_type.

NOTE—This requirement allows future definition of compatible extensions to this Specification.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 8 9 | IDR_W_RADL IDR_N_LP CRA_NUT | Coded slice of an IDR picture slice_layer_rbsp( ) Coded slice of a CRA picture silce_layer_rbsp( ) | VCL |
| 10 | GDR_NUT | Coded slice of a GDR picture slice_layer_rbsp( ) | VCL |
| 11 12 | RSV_IRAP_11 RSV_IRAP_12 | Reserved IRAP VCL NAL unit types | VCL |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |

TABLE 2-continued

| nal_unit_type | Name of nal_unit_type | Content of NAL unit and RBSP syntax structure | NAL unit type class |
|---|---|---|---|
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

NOTE—A clean random access (CRA) picture may have associated RASL or RADL pictures present in the bitstream.

NOTE—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

For VCL NAL units of any particular picture, the following applies:
  If mixed_nalu_types_in_pic_flag is equal to 0, the value of nal_unit_type shall be the same for all coded slice NAL units of a picture. A picture or a PU is referred to as having the same NAL unit type as the coded slice NAL units of the picture or PU.
  Otherwise (mixed_nalu_types_in_pic_flag equal to 1), one or more of the VCL NAL units shall all have a particular value of nal_unit_type in the range of IDR_W_RADL to CRA_NUT, inclusive, and the other VCL NAL units shall all have a particular value of nal_unit_type in the range of TRAIL_NUT to RSV_VCL_6, inclusive, or equal to GRA_NUT.

For a single-layer bitstream, the following constraints apply:
  Each picture, other than the first picture in the bitstream in decoding order, is considered to be associated with the previous IRAP picture in decoding order.
  When a picture is a leading picture of an IRAP picture, it shall be a RADL or RASL picture.
  When a picture is a trailing picture of an IRAP picture, it shall not be a RADL or RASL picture.
  No RASL pictures shall be present in the bitstream that are associated with an IDR picture.
  No RADL pictures shall be present in the bitstream that are associated with an IDR picture having nal_unit_type equal to IDR_N_LP.
    NOTE—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.
  Any picture that precedes an IRAP picture in decoding order shall precede the IRAP picture in output order and shall precede any RADL picture associated with the IRAP picture in output order.
  Any RASL picture associated with a CRA picture shall precede any RADL picture associated with the CRA picture in output order.
  Any RASL picture associated with a CRA picture shall follow, in output order, any IRAP picture that precedes the CRA picture in decoding order.
  If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture preceding picA in decoding order, and there shall be no non-leading picture between picA and picB in decoding order.

It should be noted that generally, an Intra Random Access Point (IRAP) picture is a picture that does not refer to any pictures other than itself for prediction in its decoding process. In JVET-P2001, an IRAP picture may be a clean random access (CRA) picture or an instantaneous decoder refresh (IDR) picture. In JVET-P2001, the first picture in the bitstream in decoding order must be an IRAP or a gradual decoding refresh (GDR) picture. JVET-P2001 describes the concept of a leading picture, which is a picture that precedes the associated IRAP picture in output order. JVET-P2001 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. JVET-P2001 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. The other type of picture that can follow an IRAP picture in decoding order and precede it in output order is the random access decodable leading (RADL) picture, which cannot contain references to any pictures that precede the IRAP picture in decoding order. A GDR picture, is a picture for which each VCL NAL unit has nal_unit_type equal to GDR_NUT. If the current picture is a GDR picture that is associated with a picture header which signals a syntax element receevery_poc_cnt and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture.

As provided in Table 2, a NAL unit may include a decoding parameter set syntax structure. Table 3 illustrates the syntax structure of the DPS provided in JVET-P2001.

TABLE 2

| | Descriptor |
|---|---|
| decoding_parameter_set_rbsp( ) { | |
|   dps_decoding_parameter_set_id | u(4) |
|   dps_max_sublayers_minus1 | u(3) |
|   dps_reserved_zero_5bits | u(5) |
|   dps_num_ptls_minus1 | u(4) |
|   for( i = 0; i <= dps_num_ptls_minus1; i++ ) | |
|     profile_tier_level( 1, dps_max_sublayers_minus1 ) | |
|   dps_extension_flag | u(1) |
|   if( dps_extension_flag ) | |
|     while( more_rbsp_data( ) ) | |
|       dps_extension_data_flag | u(1) |
|   rbsp_trailing_bits( ) | |
| } | |

With respect to Table 2, JVET-P2001 provides the following semantics:

A DPS RBSP shall be available to the decoding process prior to it being referenced, included in at least one AU with TemporalId equal to 0 or provided through external means.

NOTE—DPS NAL units are required to be available (either in the bitstream or by external means) to the decoding process prior to their being referenced. However, the DPS RBSP contains information that is not necessary for operation of the decoding process specified in clauses 2 through 9 of this Specification.

dps_decoding_parameter_set_id identifies the DPS for reference by other syntax elements. The value of dps_decoding_parameter_set_id shall not be equal to 0.

dps_max_sublayers_minus1 plus 1 specifies the maximum number of temporal sublayers that may be present in each CVS referring to the DPS. The value of dps_max_sublayers_minus1 shall be in the range of 0 to 6, inclusive.

dps_reserved_zero_5bits shall be equal to 0 in bitstreams conforming to this version of this Specification. Other values for dps_reserved_zero_5bits are reserved for future use by ITU-T|ISO/IEC.

dps_num_ptls_minus1 plus 1 specifies the number of profile_tier_level( ) syntax structures in the DPS.

When there is more than one profile_tier_level( ) syntax structure in a DPS, it is a requirement of bitstream conformance that each CVS in the bitstream conforms to at least one of the profile_tier_level( ) syntax structures.

dps_extension_flag equal to 0 specifies that no dps_extension_data_flag syntax elements are present in the DPS RBSP syntax structure; dps_extension_flag equal to 1 specifies that there are dps_extension_data_flag syntax elements present in the DPS RBSP syntax structure.

dps_extension_data_flag may have any value. Its presence and value do not affect decoder conformance to profiles specified. Decoders conforming to this version of this Specification shall ignore all dps_extension_data_flag syntax elements.

As provided in Table 2, a NAL unit may include a sequence parameter set syntax structure. Table 4 illustrates the syntax structure of the SPS provided in JVET-P2001.

TABLE 4

| | Descriptor |
|---|---|
| seq_parameter_set_rbsp( ) { | |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |

TABLE 4-continued

| | Descriptor |
|---|---|
| } | |
| } | |
| sps_subpic_id_present_flag | u(1) |
| if( sps_subpics_id_present_flag ) { | |
|   sps_subpic_id_signalling_present_flag | u(1) |
|   if( sps_subpics_id_signalling_present_flag ) { | |
|     sps_subpic_id_len_minus1 | ue(v) |
|     for( i = 0; i <= sps_num_subpics_minus1; i++ ) | |
|       sps_subpic_id[ i ] | u(v) |
|   } | |
| } | |
| bit_depth_minus8 | ue(v) |
| min_qp_prime_ts_minus4 | ue(v) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( 0, sps_max_sublayers_minus1, sps_sublayer_dpb_params_ | |
|   flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| sps_joint_cbcr_enabled_flag | u(1) |
| if( ChromaArrayType != 0 ) { | |
|   same_qp_table_for_chroma | u(1) |
|   numQpTables = same_qp_table_for_chroma ? 1 : ( spsjoint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| if( sps_bdpcm_enabled_flag && chroma_format_idc == 3 ) | |

TABLE 4-continued

| | Descriptor |
|---|---|
|   sps_bdpcm_chroma_enabled_flag | u(1) |
| sps_ref_wraparound_enabled_flag | u(1) |
| if( sps_ref_wraparound_enabled_flag ) | |
|   sps_ref_wraparound_offset_minus1 | ue(v) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc = = 1 ) { | |
|   sps_chroma_horizontal_collocated _flag | u(1) |
|   sps_chroma_vertical_collocated_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| sps_affine_enabled_flag | u(1) |
| if( sps_affine_enabled flag ) { | |
|   sps_affine_type_flag | u(1) |
|   sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| if( chroma_format_idc = = 3 ) { | |
|   sps_palette_enabled_flag | u(1) |
|   sps_act_enabled_flag | u(1) |
| } | |
| sps_bcw_enabled_flag | u(1) |
| sps_ibc_enabled_flag | u(1) |
| sps_ciip_enabled _flag | u(1) |
| if( sps_mmvd_enabled_flag ) | |
|   sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
|   sps_num_ver_virtual_boundaries | u(2) |
|   for( i = 0; i < sps_num_ver_virtual_boundaries; i++ ) | |
|     sps_virtual_boundaries_pos_x[ i ] | u(13) |
|   sps_num_hor_virtual_boundaries | u(2) |
|   for( i = 0; i < sps_num_hor_virtual_boundaries; i++ ) | |
|     sps_virtual_boundaries_pos_y[ i ] | u(13) |
| } | |
| if( sps_ptl_dpb_hrd_params_present flag ) { | |
|   sps_general_hrd_params_present _flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |

TABLE 4-continued

| | Descriptor |
|---|---|
| ``firstSubLayer = sps_sublayer_cpb_params_present_flag ? 0 :`` | |
| ``        sps_max_sublayers_minus1`` | |
| ``    ols_hrd_parameters( firstSubLayer, sps_max_sublayers_minus1 )`` | |
| ``  }`` | |
| ``}`` | |
| ``field_seq flag`` | u(1) |
| ``vui_parameters_present_flag`` | u(1) |
| ``if( vui_parameters_present_flag )`` | |
| ``  vui_parameters( ) /* Specified in ITU-T H.SEI | ISO/IEC 23002-7 */`` | |
| ``sps_extension_flag`` | u(1) |
| ``if( sps_extension_flag )`` | |
| ``  while( more_rbsp_data( ) )`` | |
| ``    sps_extension_data_flag`` | u(1) |
| ``rbsp_trailing_bits( )`` | |
| ``}`` | |

With respect to Table 4, JVET-P2001 provides the following semantics:

An SPS RBSP shall be available to the decoding process prior to it being referenced, included in at least one AU with TemporalId equal to 0 or provided through external means.

All SPS NAL units with a particular value of sps_seq_parameter_set_id in a CVS shall have the same content.

sps_decodingparameter_set_id, when greater than 0, specifies the value of dps_decoding_parameter_set_id for the DPS referred to by the SPS. When sps_decoding_parameter_set_id is equal to 0, the SPS does not refer to a DPS and no DPS is referred to when decoding each CLVS referring to the SPS. The value of sps_decoding_parameter_set_id shall be the same in all SPSs that are referred to by coded pictures in a bitstream.

sps_video_parameter_set_id, when greater than 0, specifies the value of vps_video_parameter_set_id for the VPS referred to by the SPS.

When sps_video_parameter_set_id is equal to 0, the following applies:
  The SPS does not refer to a VPS.
  No VPS is referred to when decoding each CLVS referring to the SPS.
  The value of vps_max_layers_minus1 is inferred to be equal to 0.
  The CVS shall contain only one layer (i.e., all VCL NAL unit in the CVS shall have the same value of nuh_layer_id).
  The value of GeneralLayerIdx[nuh_layer_id] is inferred to be equal to 0.
  The value of vps_independent_layer_flag[GeneralLayerIdx[nuh_layer_id]] is inferred to be equal to 1.

When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.

sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.

sps_reserved_zero_4bits shall be equal to 0 in bitstreams conforming to this version of this Specification. Other values for sps_reserved_zero_4bits are reserved for future use by ITU-T|ISO/IEC.

sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these syntax structures is present in the SPS. The value of sps_ptl_dpb_hrd_params_present_flag shall be equal to vps_independent_layer_flag[nuh_layer_id].

If vps_independent_layer_flag[GeneralLayerIdx[nuh_layer_id]] is equal equal to 1, the variable MaxDecPicBuffMinus1 is set equal to max_dec_pic_buffering_minus1[sps_max_sublayers_minus1] in the dpb_parameters( ) syntax structure in the SPS. Otherwise, MaxDecPicBuffMinus1 is set equal to max_dec_pic_buffering_minus1[sps_max_sublayers_minus1] in the layer_nonoutput_dpb_params_idx[GeneralLayerIdx[nuh_layer_id]]-thdpb_parameters( ) syntax structure in the VPS.

gdr_enabled_flag equal to 1 specifies that GDR pictures may be present in CLVSs referring to the SPS. gdr_enabled_flag equal to 0 specifies that GDR pictures are not present in CLVSs referring to the SPS.

sps_seq_parameter_set_id provides an identifier for the SPS for reference by other syntax elements.

SPS NAL units, regardless of the nuh_layer_id values, share the same value space of sps_seqparameter_set_id.

chroma_format_ide specifies the chroma sampling relative to the luma sampling as specified.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:
  If separate_colour_plane_flag is equal to 0, ChromaArrayType is set equal to chroma_format_ide.
  Otherwise (separate_colour_plane_flag is equal to 1), ChromaArrayType is set equal to 0.
ref_pic_resampling_enabled_flag equal to 1 specifies that reference picture resampling may be applied when decoding coded pictures in the CLVSs referring to the SPS. ref_pic_resampling_enabled_flag equal to 0 specifies that reference picture resampling is not applied when decoding pictures in CLVSs referring to the SPS.
pic_width_max_in_luma_samples specifies the maximum width, in units of luma samples, of each decoded picture referring to the SPS. pic_width_max_in_luma_samples shall not be equal to 0 and shall be an integer multiple of Max(8, MinCbSizeY).
pic_height_max_in_luma_samples specifies the maximum height, in units of luma samples, of each decoded picture referring to the SPS. pic_height_max_in_luma_samples shall not be equal to 0 and shall be an integer multiple of Max(8, MinCbSizeY).
sps_log_2_ctu_size_minus5 plus 5 specifies the luma coding tree block size of each CTU. It is a requirement of bitstream conformance that the value of sps_log_2_ctu_size_minus5 be less than or equal to 2.
The variables CtbLog 2SizeY and CtbSizeY are derived as follows:

$$\text{Ctb Log 2SizeY} = \text{sps\_log 2\_ctu\_size\_minus5} + 5$$

$$\text{CtbSizeY} = 1 \gg \text{Ctb Log 2SizeY}$$

subpics_present_flag equal to 1 specifies that subpicture parameters are present in in the SPS RBSP syntax. subpics_present_flag equal to 0 specifies that subpicture parameters are not present in the SPS RBSP syntax.
  NOTE—When a bitstream is the result of a sub-bitstream extraction process and contains only a subset of the subpictures of the input bitstream to the sub-bitstream extraction process, it might be required to set the value of subpics_present flag equal to 1 in the RBSP of the SPSs.
sps_num_subpics_minus1 plus 1 specifies the number of subpictures. sps_num_subpics_minus1 shall be in the range of 0 to 254. When not present, the value of sps_num_subpics_minus1 is inferred to be equal to 0.
subpic_ctu_top_left_x[i] specifies horizontal position of top left CTU of i-th subpicture in unit of CtbSizeY. The length of the syntax element is Ceil(Log 2(pic_width_max_in_luma_samples/CtbSizeY)) bits. When not present, the value of subpic_ctu_top_left-x[i] is inferred to be equal to 0.
subpic_ctu_top_left_y[i] specifies vertical position of top left CTU of i-th subpicture in unit of CtbSizeY. The length of the syntax element is Ceil(Log 2(pic_height_max_in_luma_samples/CtbSizeY)) bits. When not present, the value of subpic_ctu_top_left_y[i] is inferred to be equal to 0.
subpic_width_minus1[i] plus 1 specifies the width of the i-th subpicture in units of CtbSizeY. The length of the syntax element is Ceil(Log 2(pic_width_max_in_luma_samples/CtbSizeY)) bits. When not present, the value of subpic_width_minus1[i] is inferred to be equal to Ceil(pic_width_max_in_luma_samples/CtbSizeY)−1.
subpic_height_minus1[i] plus 1 specifies the height of the i-th subpicture in units of CtbSizeY. The length of the syntax element is Ceil(Log 2(pic_height_max_in_luma_samples/CtbSizeY)) bits. When not present, the value of subpic_height_minus1[i] is inferred to be equal to Ceil(pic_height_max_in_luma_samples/CtbSizeY)−1.
subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to 0.
loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to 1.
It is a requirement of bitstream conformance that the following constraints apply:
  For any two subpictures subpicA and subpicB, when the subpicture index of subpicA is less than that of subpicB, any coded slice NAL unit of subPicA shall precede any coded slice NAL unit of subPicB in decoding order.
  The shapes of the subpictures shall be such that each subpicture, when decoded, shall have its entire left boundary and entire top boundary consisting of picture boundaries or consisting of boundaries of previously decoded subpictures.
sps_subpicid_present_flag equal to 1 specifies that subpicture ID mapping is present in the SPS. sps_subpic_id_present_flag equal to 0 specifies that subpicture ID mapping is not present in the SPS.
sps_subpic_id_signal_lingpresent_flag equal to 1 specifies that subpicture ID mapping is signalled in the SPS. sps_subpic_id_signalling_present_flag equal to 0 specifies that subpicture ID mapping is not signalled in the SPS. When not present, the value of sps_subpic_id_signalling_present_flag is inferred to be equal to 0.
sps_subpic_id_len_minus1 plus 1 specifies the number of bits used to represent the syntax element sps_subpic id[i]. The value of sps_subpic_id_len_minus1 shall be in the range of 0 to 15, inclusive.
sps_subpic_id[i] specifies that subpicture ID of the i-th subpicture. The length of the sps_subpic_id[i] syntax element is sps_subpic_id_len_minus1+1 bits. When not present, and when sps_subpic_id_present_flag equal to 0, the value of sps_subpic_id[i] is inferred to be equal to i, for each i in the range of 0 to sps_num_subpics_minus1, inclusive
bit_depth_minus8 specifies the bit depth of the samples of the luma and chroma arrays, BitDepth, and the value of the luma and chroma quantization parameter range offset, QpBdOffset, as follows:

BitDepth=8+bit_depth_minus8

$Q_p$BdOffset=6*bit_depth_minus8 bit_depth_minus8 shall be in the range of 0 to 8, inclusive.

min_qp_prime_ts_minus4 specifies the minimum allowed quantization parameter for transform skip mode as follows:

$Q_p$PrimeTsMin=4+min_qp_prime_ts_minus4

The value of min_qp_prime_ts_minus4 shall be in the range of 0 to 48, inclusive.

sps_weighted_pred_flag equal to 1 specifies that weighted prediction may be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

log_2_maxpic_order_cnt_lsb_minus4 specifies the value of the variable MaxPicOrderCntLsb that is used in the decoding process for picture order count as follows:

MaxPicOrderCntLsb=$2^{(log\ 2\_max\_pic\_order\_cnt\_lsb\_minus4+4)}$

The value of log 2_max_pic_order_cnt_lsb_minus4 shall be in the range of 0 to 12, inclusive.

sps_poc_msb_flag equal to 1 specifies that the ph_poc_msb_cycle_present_flag syntax element is present in PHs referring to the SPS. sps_poc_msb_flag equal to 0 specifies that the ph_poc_msb_cycle_present_flag syntax element is not present in PHs referring to the SPS.

poc_msb_len_minus1 plus 1 specifies the length, in bits, of the poc_msb_val syntax elements, when present in the PHs referring to the SPS. The value of poc_msb_len_minus1 shall be in the range of 0 to 32−log 2_max_pic_order_ent_lsb_minus4−5, inclusive.

sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, the value of sps_sub_dpbparams_info_present_flag is inferred to be equal to 0.

long_term_ref_pics_flag equal to 0 specifies that no ILRP is used for inter prediction of any coded picture in the CLVS. long_term_ref pics_flag equal to 1 specifies that LTRPs may be used for inter prediction of one or more coded pictures in the CLVS.

inter_layer_ref_pics_present_flag equal to 0 specifies that no ILRP is used for inter prediction of any coded picture in the CLVS. inter_layer_ref_pics_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag[GeneralLayerIdx[nuh_layer_id]] is equal to 1, the value of inter_layer_ref_pics_present_flag shall be equal to 0.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax element num_ref_pic_lists_in_sps[1] and the syntax structure ref_pic_list_struct(1, rplsIdx) are not present and the following applies:
  The value of num_ref_pic_lists_in sps[1] is inferred to be equal to the value of num_ref_pic_lists_in_sps[0].
  The value of each of syntax elements in ref_pic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.
  NOTE—For each value of listIdx (equal to 0 or 1), a decoder should allocate memory for a total number of num_ref_pic_lists_in_sps[i]+1 ref_pic_list_struct (listIdx, rplsIdx) syntax structures since there may be one ref_pic_list_struct(listIdx, rplsIdx) syntax structure directly signalled in the slice headers of a current picture.

qtbtt_dual_tree_intra_flag equal to 1 specifies that for I slices, each CTU is split into coding units with 64×64 luma samples using an implicit quadtree split and that these coding units are the root of two separate coding_tree syntax structure for luma and chroma. qtbtt_dual_tree_intra_flag equal to 0 specifies separate coding_tree syntax structure is not used for I slices. When qtbtt_dual_tree_intra_flag is not present, it is inferred to be equal to 0.

log 2_min_luma_coding_block_size_minus2 plus 2 specifies the minimum luma coding block size. The value range of log 2_min_luma_coding_block_size_minus2 shalll be in the range of 0 to log 2_ctu_size_minus5+3, inclusive.

The variables MinCbLog 2SizeY, MinCbSizeY, IbcBufWidthY, IbcBufWidthC and Vsize are derived as follows:

MinCb Log 2Size$Y$=log 2_min_luma_coding_block_size minus2+2

MinCbSize$Y$=1<<MinCb Log 2Size$Y$

IbcBufWidth$Y$=256*128/CtbSize$Y$

IbcBufWidth$C$=IbcBufWidth$Y$/SubWidth$C$ $V$Size=Min(64,CtbSize$Y$)

The value of MinCbSizeY shall less than or equal to VSize.

The variables CtbWidthC and CtbHeightC, which specify the width and height, respectively, of the array for each chroma CTB, are derived as follows:
  If chroma_format_ide is equal to 0 (monochrome) or separate_colour_plane_flag is equal to 1, CtbWidthC and CtbHeightC are both equal to 0.
  Otherwise, CtbWidthC and CtbHeightC are derived as follows:

CtbWidth$C$=CtbSize$Y$/SubWidth$C$

CtbHeight$C$=CtbSize$Y$/SubHeight$C$

For log 2BlockWidth ranging from 0 to 4 and for log 2BlockHeight ranging from 0 to 4, inclusive, the up-right diagonal and raster scan order array initialization process as specified is invoked with 1<<log 2BlockWidth and 1<<log 2BlockHeight as inputs, and the output is assigned to DiagScanOrder[log 2BlockWidth][log 2BlockHeight]. For log 2BlockWidth ranging from 0 to 6 and for log 2BlockHeight ranging from 0 to 6, inclusive, the horizontal and vertical traverse scan order array initialization process as specified is invoked with 1<<<log 2BlockWidth and 1<<log 2BlockHeight as inputs, and the output is assigned to HorTravScanOrder[log 2BlockWidth][log 2BlockHeight] and VerTravScanOrder[log 2BlockWidth][log 2BlockHeight].

partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS.

sps_log 2_diff_min_qt_min_eb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_enabled_flag is equal to 1, the default difference can be overridden by pic_log 2_diff_min qt_min_cb_luma present in PHs referring to the SPS. The value of sps_log 2_diff_min_qt_min_cb_intra_slice_luma shall be in the range of 0 to CtbLog 2SizeY−MinCbLog 2SizeY, inclusive. The base 2 logarithm of the minimum size in luma samples of a luma leaf block resulting from quadtree splitting of a CTU is derived as follows:

MinQt Log 2SizeIntraY=sps_log 2_diff_min_qt_min_cb_intra_slice_luma+MinCb Log 2SizeY sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice type equal to 0 (B) or 1 (P) referring to the SPS. When partition_constraints_override_enabled_flag is equal to 1, the default difference can be overridden by pic_log 2_diff min_qt_min_cb_luma present in PHs referring to the SPS. The value of sps_log 2_diff min_qt_min_eb_inter_slice shall be in the range of 0 to CtbLog 2SizeY−MinCbLog 2SizeY, inclusive. The base 2 logarithm of the minimum size in luma samples of a luma leaf block resulting from quadtree splitting of a CTU is derived as follows:

MinQt Log 2SizeInterY=sps_log 2 diff_min_qt_min_cb_inter_slice+MinCb Log 2SizeY sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_enabled_flag is equal to 1, the default maximum hierarchy depth can be overridden by pic_max_mtt_hierarchy_depth_inter_slice present in PHs referring to the SPS. The value of sps_max_mtt_hierarchy_depth_inter_slice shall be in the range of 0 to 2*(CtbLog 2SizeY−MinCbLog 2SizeY), inclusive.

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_enabled_flag is equal to 1, the default maximum hierarchy depth can be overridden by pic_max_mtt_hierarchy_depth_intra_slice_luma present in PHs referring to the SPS. The value of sps_max_mtt_hierarchy_depth_intra_slice_luma shall be in the range of 0 to 2*(CtbLog 2SizeY−MinCbLog 2SizeY), inclusive.

sps_log 2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice-type equal to 2 (I) referring to the SPS. When partition_constraints_override_enabled_flag is equal to 1, the default difference can be overridden by pic_log 2_diff_max_bt_min_qt_luma present in PHs referring to the SPS. The value of sps_log 2_diff_max_bt_min_qt_intra_slice_luma shall be in the range of 0 to CtbLog 2SizeY−MinQtLog 2SizeIntraY, inclusive. When sps_log 2_diff_max_bt_min_qt_intra_slice_luma is not present, the value of sps_log 2_diff_max_bt_min_qt_intra_slice_luma is inferred to be equal to 0.

sps_log 2_diff_max_bt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by pic_log 2_diff_max_bt_min_qt_luma present in PHs referring to the SPS. The value of sps_log 2_diff_max_bt_min_qt_intra_slice_luma shall be in the range of 0 to CtbLog 2SizeY−MinQtLog 2SizeIntraY, inclusive. When sps_log 2_diff_max_bt_min_qt_intra_slice_luma is not present, the value of sps_log 2_diff_max_bt_min_qt_intra_slice_luma is inferred to be equal to 0.

sps_log 2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by pic_log 2_diff_max_bt_min_qt_luma present in PHs referring to the SPS. The value of sps_log 2_diff_max_bt_min_qt_inter_slice shall be in the range of 0 to CtbLog 2SizeY−MinQtLog 2SizeInterY, inclusive. When sps_log 2_diff_max_bt_min_qt_inter_slice is not present, the value of sps_log 2_diff_max_bt_min_qt_inter_slice is inferred to be equal to 0.

sps_log 2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by pic_log 2_diff_max_tt_min_qt_luma present in PHs referring to the SPS. The value of sps_log 2_diff_max_bt_min_qt_inter_slice shall be in the range of 0 to CtbLog 2SizeY−MinQtLog 2SizeInterY, inclusive. When sps_log 2_diff_max_bt_min_qt_inter_slice is not present, the value of sps_log 2_diff_max_tt_min_qt_inter_slice is inferred to be equal to 0.

sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) referring to the SPS. When partition_constraints_override_enabled_flag is equal to 1, the default difference can be overridden by pic_log 2diff_min_qt_min_cb_chroma present in PHs referring to the SPS. The value of sps_log 2_diff_min_qt_min_cb_intra_slice_chroma shall be in the range of 0 to CtbLog 2SizeY−MinCbLog 2SizeY, inclusive. When not present, the value of sps log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

MinQt Log 2SizeIntraC=sps_log 2 diff_min_qt_min_cb_intra_slice_chroma+MinCb Log 2SizeY sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_enabled_flag is equal to 1, the default maximum hierarchy depth can be overridden by pic_max_mtt_hierarchy_depth_chroma present in PHs referring to the SPS. The value of sps_max_mtt_hierarchy_depth_intra_slice_chroma shall be in the range of 0 to 2*(CtbLog 2SizeY−MinCbLog 2SizeY), inclusive. When not present, the value of sps_max_mtt_hierarchy_depth_intra_slice_chroma is inferred to be equal to 0.

sps_log 2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by pic_log 2_diff_max_bt_min_qt_chroma present in PHs referring to the SPS. The value of sps_log 2_diff_max_bt_min_qt_intra_slice_chroma shall be in the range of 0 to CtbLog 2SizeY−MinQtLog 2SizeIntraC, inclusive. When sps_log 2diff_max_bt_min_qt_intra_slice_chroma is not present, the value of sps_log 2_diff_max_bt_min_qt_intra_slice-chroma is inferred to be equal to 0.

sps_log 2_diff_max_bt_min_qt_intra_slice-chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice-type equal to 2 (I) referring to the SPS. When partition_constraints_override_enabled_flag is equal to 1, the default difference can be overridden by pic_log 2_diff_max_bt_min_qt_chroma present in PHs referring to the SPS. The value of sps_log 2_diff_max_bt_min_qt_intra_slice_chroma shall be in the range of 0 to CtbLog 2SizeY−MinQtLog 2SizeIntraC, inclusive. When sps_log 2_diff_max_tt_min_qt_intra_slice_chroma is not present, the value of sps_log 2_diff_max_tt_min_qt_intra_slice_chroma is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32. When CtbSizeY is less than 64, the value of sps_max_luma_transform_size_64_flag shall be equal to 0.

The variables MinTbLog 2SizeY, MaxTbLog 2SizeY, MinTbSizeY, and MaxTbSizeY are derived as follows:

MinTb Log 2SizeY=2

MaxTb Log 2SizeY=sps_max_luma_transform_size_64_flag?6: 5

MinTbSizeY=1<<MinTb Log 2SizeY

MaxTbSizeY=1<<MaxTb Log 2SizeY sps_joint_cbcr_enabled_flag equal to 0 specifies that the joint coding of chroma residuals is disabled. sps_joint_cbcr_enabled_flag equal to 1 specifies that the joint coding of chroma residuals is enabled.

same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.

qp_table_start_minus26[i] plus 26 specifies the starting luma and chroma QP used to describe the i-th chroma QP mapping table. The value of qp_table_start_minus26[i] shall be in the range of −26—QpBdOffset to 36 inclusive. When qp_table_start_minus26[i] is not present in the bitstream, the value of qp_table_start_minus26[i] is inferred to be equal to 0.

num_points_in_qp_table_minus1[i] plus 1 specifies the number of points used to describe the i-th chroma QP mapping table. The value of num_points_in_qp_table_minus1[i] shall be in the range of 0 to 63+QpBdOffset, inclusive. When num_points_in_qp_table_minus1[0] is not present in the bitstream, the value of num_points_in_qp_table_minus1[0] is inferred to be equal to 0.

delta_qp_inval_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 . . . numQpTables−1 is derived as follows:

```
qpInVal[ i ][ 0 ] = −qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
  qpInVal[ i ][ j + 1 ] = qpInVal[ i ][ j ] + delta_qp_in_val_minus1[ i ][ j ] + 1
  qpOutVal[ i ][ j + 1 ] = qpOutVal[ i ][ j ] +
  ( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
  ChromaQpTable[ i ][ k ] = Clip3( −QpBdOffset, 63,
ChromaQpTable[ i ][ k + 1 ] − 1 )
for( j = 0; j <+ num_points_in_qp_table_minus1[ i ]; j++ ) {
  sh = ( delta_qp_in_val_minus1[ i ][ j ] + 1 ) >> 1
  for( k = qpInVal[ i ][ j ] + 1, m = 1; k <= qpInval[ i ][ j + 1 ]; k++, m++ )
    ChromaQpTable[ i ][ k ] = ChromaQpTable[ i ][ qpInVal[ i ][ j ] ] +
    ( ( qpOutVal[ i ][j + 1] − qpOutVal[ i ][ j ] ) * m + sh ) /
( delta_qp_in_val_minus1[ i ][j] + 1 )
}
for( k = qpInVal[ i ][ num_points_in_qp_table_minus1[ i ] + 1 ] + 1; k <= 63; k++ )
  ChromaQpTable[ i ] [ k ] = Clip3( −QpBdOffset, 63, ChromaQpTable[ i ][ k − 1 ] + 1 )
When same_qp_table_for_chroma is equal to 1, ChromaQpTable [ 1 ][ k ] and
ChromaQpTablet[ 2 ][ k ] are set equal to ChromaQpTable[ 0 ][ k ] for k =
−QpBdOffset..63.
It is a requirement of bitstream conformance that the values of qpInVal[ i ][ j ] and
qpOutVal[ i ][ j ] shall be in the range of −QpBdOffset to 63, inclusive for i = 0..
numQpTables − 1 and j = 0..num_points_in_qp__table_minus1[ i ] + 1.
``` sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_transform_skip_enabled_flag equal to 1 specifies that transform_skip_flag may be present in the transform unit syntax. sps_transform_skip_enabled_flag equal to 0 specifies that transform_skip_flag is not present in the transform unit syntax sps_bdpcm_enabled_flag equal to 1 specifies that intra_bdpcm_luma_flag may be present in the coding unit syntax for intra coding units. sps_bdpcm_enabled_flag equal to 0 specifies that intra_bdpcm_luma_flag is not present in the coding unit syntax for intra coding units. When not present, the value of sps_bdpcm_enabled_flag is inferred to be equal to 0.

sps_bdpcm_chroma_enabled_flag equal to 1 specifies that intra_bdpcm_chroma_flag may be present in the coding unit syntax for intra coding units. sps_bdpcm_chroma_enabled_flag equal to 0 specifies that intra_bdpcm_chroma_flag is not present in the coding unit syntax for intra coding units. When not present, the value of sps_bdpcm_chroma_enabled_flag is inferred to be equal to 0.

sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When the value of (CtbSizeY/MinCbSizeY+1) is less than or equal to (pic_width_in_luma_samples/MinCbSizeY−1), where pic_width_in_luma_samples is the value of pic_width_in_luma_samples in any PPS that refers to the SPS, the value of sps_ref_wraparound_enabled_flag shall be equal to 0.

sps_ref_wraparound_offset_minus1 plus 1 specifies the offset used for computing the horizontal wrap-around position in units of MinCbSizeY luma samples. The value of ref_wraparound_offset_minus1 shall be in the range of (CtbSizeY/MinCbSizeY)+1 to (pic_width_in_luma_samples/MinCbSizeY)−1, inclusive, where pic_width_in_luma_samples is the value of pic_width_in_luma_samples in any PPS that refers to the SPS.

sps_temporal_mvp_enabled_flag equal to 1 specifies that temporal motion vector predictors may be used in the CLVS. sps_temporal_mvp_enabled_flag equal to 0 specifies that temporal motion vector predictors are not used in the CLVS.

sps_sbtmvp_enabled_flag equal to 1 specifies that sub-block-based temporal motion vector predictors may be used in decoding of pictures with all slices having slice type not equal to I in the CLVS. sps_sbtmvp_enabled_flag equal to 0 specifies that subblock-based temporal motion vector predictors are not used in the CLVS. When sps_sbtmvp_enabled_flag is not present, it is inferred to be equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_bdof_enabled_flag equal to 0 specifies that the bi-directional optical flow inter prediction is disabled. sps_bdof_enabled_flag equal to 1 specifies that the bi-directional optical flow inter prediction is enabled.

sps_bdof_pic_present_flag equal to 1 specifies that pic_disable_bdof_flag is present in PHs referring to the SPS. sps_bdof_pic_present_flag equal to 0 specifies that pic_disable_bdof_flag is not present in PHs referring to the SPS. When sps_bdof_pic_present_flag is not present, the value of sps_bdof_pic_present_flag is inferred to be equal to 0.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_dmvr_pic_present_flag equal to 1 specifies that pic_disable_dmvr_flag is present in PHs referring to the SPS. sps_dmvr_pic_present_flag equal to 0 specifies that pic_disable_dmvr_flag is not present in PHs referring to the SPS. When sps_dmvr_pic_present_flag is not present, the value of sps_dmvr_pic_present_flag is inferred to be equal to 0.

sps_mmvd_enabled_flag equal to 1 specifies that merge mode with motion vector difference is enabled. sps_mmvd_enabled_flag equal to 0 specifies that merge mode with motion vector difference is disabled.

sps_isp_enabled_flag equal to 1 specifies that intra prediction with subpartitions is enabled. sps_isp_enabled_flag equal to 0 specifies that intra prediction with subpartitions is disabled.

sps_mrl_enabled_flag equal to 1 specifies that intra prediction with multiple reference lines is enabled. sps_mrl_enabled_flag equal to 0 specifies that intra prediction with multiple reference lines is disabled.

sps_mip_enabled_flag equal to 1 specifies that matrix-based intra prediction is enabled. sps_mip_enabled_flag equal to 0 specifies that matrix-based intra prediction is disabled.

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled. When sps_cclm_enabled_flag is not present, it is inferred to be equal to 0.

sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.

sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.

sps_mts_enabled_flag equal to 1 specifies that sps_explicit_mts_intra_enabled_flag is present in the sequence parameter set RBSP syntax and that sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and that sps_explicit_mts_inter_enabled_flag is not present in the sequence parameter set RBSP syntax.

sps_explicit_mts_intra_enabled_flag equal to 1 specifies that mts_idx may be present in intra coding unit syntax. sps_explicit_mts_intra_enabled_flag equal to 0 specifies that mts_idx is not present in intra coding unit syntax. When not present, the value of sps_explicit_mts_intra_enabled_flag is inferred to be equal to 0.

sps_explicit_mts_inter_enabled_fag equal to 1 specifies that mts_idx may be present in inter coding unit syntax. sps_explicit_mts_inter_enabled_flag equal to 0 specifies that mts_idx is not present in inter coding unit syntax. When not present, the value of sps_explicit_mts_inter_enabled_flag is inferred to be equal to 0.

sps_sbt_enabled_flag equal to 0 specifies that subblock transform for inter-predicted CUs is disabled. sps_sbt_enabled_flag equal to 1 specifies that subblock transform for inter-predicteds CU is enabled.

sps_afffne_enabled_flag specifies whether affine model based motion compensation can be used for inter prediction. If sps_affine_enabled_flag is equal to 0, the syntax shall be constrained such that no affine model based motion compensation is used in the CLVS, and inter_affine_flag and cu_affine_type flag are not present in coding unit syntax of the CLVS. Otherwise (sps_affine_enabled_flag is equal to 1), affine model based motion compensation can be used in the CLVS.

sps_affine_type_flag specifies whether 6-parameter affine model based motion compensation can be used for inter prediction. If sps affine_type_flag is equal to 0, the syntax shall be constrained such that no 6-parameter affine model based motion compensation is used in the CLVS, and cu_affine_type flag is not present in coding unit syntax in the CLVS. Otherwise (sps_affine_type_flag is equal to 1), 6-parameter affine model based motion compensation can be used in the CLVS. When not present, the value of sps affine type flag is inferred to be equal to 0.

sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.

sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.

sps_prof_pic_present_flag equal to 1 specifies that pic_disable_prof_flag is present in PHs referring to the SPS. sps_prof_pic_present flag equal to 0 specifies that pic_disable_prof_flag is not present in PHs referring to the SPS. When sps_prof_pic_present_flag is not present, the value of sps_prof_pic_present_flag is inferred to be equal to 0.

sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

sps_act_enabled_flag equal to 1 specifies that adaptive colour transform may be used and the cu_act_enabled_flag may be present in the coding unit syntax. sps_act_enabled_flag equal to 0 specifies that adaptive colour transform is not used and cu_act_enabled_flag is not present in the coding unit syntax. When sps_act_enabled_flag is not present, it is inferred to be equal to 0.

sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS.

sps_ibc_enabled_flag equal to 1 specifies that the IBC prediction mode may be used in decoding of pictures in the CLVS. sps_ibc_enabled_flag equal to 0 specifies that the IBC prediction mode is not used in the CLVS. When sps_ibc_enabled_flag is not present, it is inferred to be equal to 0.

sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

sps_triangle_enabled_flag specifies whether triangular shape based motion compensation can be used for inter prediction. sps_triangle_enabled_flag equal to 0 specifies that the syntax shall be constrained such that no triangular shape based motion compensation is used in the CLVS, and merge_triangle_split_dir, merge_triangle_idx0, and merge_triangle_idx1 are not present in coding unit syntax of the CLVS. sps_triangle_enabled_flag equal to 1 specifies that triangular shape based motion compensation can be used in the CLVS.

sps_lmes_enabled_flag equal to 1 specifies that luma mapping with chroma scaling is used in the CLVS. sps_lmes_enabled_flag equal to 0 specifies that luma mapping with chroma scaling is not used in the CLVS.

sps_lfirst_enabled_flag equal to 1 specifies that lfnst_idx may be present in intra coding unit syntax. sps_lfnst_enabled_flag equal to 0 specifies that lfnst_idx is not present in intra coding unit syntax.

sps_ladf_enabled_flag equal to 1, specifies that sps_num_ladf_intervals_minus2, sps_ladf_lowest_interval_qp_offset, sps_ladf_qp_offset[i], and sps_ladf_delta_threshold_minus1[i] are present in the SPS.

sps_num_ladf_intervals_minus2 plus 1 specifies the number of sps_ladf_delta_threshold_minus1[i] and sps_ladf_qp_offset[i] syntax elements that are present in the SPS. The value of sps_num_ladf_intervals_minus2 shall be in the range of 0 to 3, inclusive.

sps_ladf_lowest_interval_qp_offset specifies the offset used to derive the variable qP as specified. The value of sps_ladf_lowest_interval_qp_offset shall be in the range of −63 to 63, inclusive.

sps_ladf_qp_offset[i] specifies the offset array used to derive the variable qP as specified. The value of sps_ladf_qp_offset[i] shall be in the range of −63 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_delta_threshold_minus1[i] shall be in the range of 0 to $2^{BitDepth}-3$, inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

SpsLadfIntervalLowerBound[$i$+1]=SpsLadfIntervalLowerBound[$i$]+sps_ladf_delta_threshold_minus1[$i$]+1 sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients.

sps_loop_filter_across_virtual_boundaries_disabledpresent flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.

sps_num_ver_virtual_boundaries specifies the number of sps_virtual_boundaries_pos_x[i] syntax elements that are present in the SPS. When sps_num_ver_virtual_boundaries is not present, it is inferred to be equal to 0.

sps_virtual_boundaries_pos_x[i] is used to compute the value of VirtualBoundariesPosX[i], which specifies the location of the i-th vertical virtual boundary in units of luma samples. The value of sps_virtual_boundaries_pos_x[i] shall be in the range of 1 to Ceil(pic_width_in_luma_samples+8)−1, inclusive.

sps_num_hor_virtual_boundaries specifies the number of sps_virtual_boundaries_pos_y[i] syntax elements that are present in the SPS. When sps_num_hor_virtual_boundaries is not present, it is inferred to be equal to 0.

sps_virtual_boundaries_pos_y[i] is used to compute the value of VirtualBoundariesPosY[i], which specifies the location of the i-th horizontal virtual boundary in units of luma samples. The value of sps_virtual_boundaries_posy[i] shall be in the range of 1 to Ceil (pic_height_in_luma_samples+8)−1, inclusive.

sps_general_hrd_paramspresent_flag equal to 1 specifies that the syntax structure general_hrd_parameters( ) is present in the SPS RBSP syntax structure. sps_general_hrd_params_present_flag equal to 0 specifies that the syntax structure general_hrd_parameters( ) is not present in the SPS RBSP syntax structure.

sps_sublayer_cpb_params_resent_flag equal to 1 specifies that the syntax structure old_hrd_parameters( ) in the SPS RBSP includes HRD parameters for sublayer representations with TemporalId in the range of 0 to sps_max_sublayers_minus1, inclusive. sps_sublayer_cpb_params_present_flag equal to 0 specifies that the syntax structure ols_hrd_parameters( ) in the SPS RBSP includes HRD parameters for the sublayer representation with TemporalId equal to sps_max_sublayers_minus1 only.

When sps_max_sublayers_minus1 is equal to 0, the value of sps_sublayer-cpb_params_present_flag is inferred to be equal to 0.

When sps_sublayer_cpb_params_present_flag is equal to 0, the HRD parameters for the sublayer representations with TemporalId in the range of 0 to sps_max_sublayers_minus1−1, inclusive, are inferred to be the same as that for the sublayer representation with TemporalId equal to sps_max_sublayers_minus1. These include the HRD parameters starting from the fixed_pic_rate_general_flag[i] syntax element till the sublayer_hrd_parameters(i) syntax structure immediately under the condition "if (general_vcl_hrd_params_present_flag)" in the ols_hrd_parameters syntax structure.

field_seq_flag equal to 1 indicates that the CLVS conveys pictures that represent fields. field_seq_flag equal to 0 indicates that the CLVS conveys pictures that represent frames. When general_frame_only_constraint_flag is equal to 1, the value of field_seq_flag shall be equal to 0.

When field_seq_flag is equal to 1, a frame-field information SEI message shall be present for every coded picture in the CLVS.

NOTE—The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920×540, while the sequence picture rate would commonly express the rate of the source fields (typically between 50 and 60 Hz), instead of the source frame rate (typically between 25 and 30 Hz).

vui_parameters_present_flag equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification shall ignore all sps_extension_data_flag syntax elements.

As provided in Table 2, a NAL unit may include a sequence parameter set syntax structure. Table 5 illustrates the syntax structure of the PPS provided in JVET-P2001.

TABLE 5

| | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |

TABLE 5-continued

| | Descriptor |
|---|---|
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|         tile_column_width_minus1[ i ] | ue(v) |
|     for( i = 0; i <= num_exp_tile_rows_minus1; i++ ) | |
|         tile_row_height_minus1[ i ] | ue(v) |
|     rect_slice_flag | u(1) |
|     if( rect_slice_flag ) | |
|         single_slice_per_subpic_flag | u(1) |
|     if( rect_slice_flag && !single_slice_per_subpic_flag ) { | |
|         num_slices_in_pic_minus1 | ue(v) |
|         tile_idx_delta_present_flag | u(1) |
|         for( i = 0; i < num_slices_in_pic_minus1; i++ ) { | |
|             slice_width_in_tiles_minus1[ i ] | ue(v) |
|             slice_height_in_tiles_minus1[ i ] | ue(v) |
|             if( slice_width_in_tiles_minus1[ i ] == 0 && | |
|                 slice_height_in_tiles_minus1[ i ] == 0 ){ | |
|                 num_slices_in_tile_minus1[ i ] | ue(v) |
|                 numSlicesInTileMinus1 = num_slices in tile minus1[ i ] | |
|                 for( j = 0; j < numSlicesInTileMinus1; j++ ) | |
|                     slice_height_in_ctu_minus1[ i++ ] | ue(v) |
|             } | |
|             if( tile_idx_delta_present_flag && i < num_slices in pic_ | |
|             minus1 ) | |
|                 tile_idx_delta[ i ] | se(v) |
|         } | |
|     } | |
|     loop_filter_across_tiles_enabled_flag | u(1) |
|     loop_filter_across_slices_enabled_flag | u(1) |
| } | |
| entropy_coding_sync_enabled_flag | u(1) |
| if( !no_pic_partition_flag \|\| entropy_coding_sync_enabled_flag ) | |
|         entry_point_offsets_present_flag | u(1) |
|   cabac_init_present flag | u(1) |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
|   log2_transform_skip_max_size_minus2 | ue(v) |
|   cu_qp_delta_enabled_flag | u(1) |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
|   if( pps_cu_chroma_qp_offset_list_enabled_flag ) { | |
|     chroma_qp_offset_list_len_minus1 | ue(v) |
|     for( i = 0; i <= chroma_qp_offset_list_len_minus1; i++ ) { | |
|         cb_qp_offset_list[ i ] | se(v) |
|         cr_qp_offset_list[ i ] | se(v) |
|         if( pps_joint_cbcr_qp_offset_present_flag ) | |
|             joint_cbcr_qp_offset_list[ i ] | se(v) |
|     } | |
|   } | |
|   pps_weighted_pred_flag | u(1) |
|   pps_weighted_bipred_flag | u(1) |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|         pps_beta_offset_div2 | se(v) |
|         pps_tc_offset_div2 | se(v) |
|     } | |
|   } | |
|   constant_slice_header_params_enabled_flag | u(1) |
|   if( constant_slice_header_params_enabled_flag ) { | |
|     pps_dep_quant_enabled_idc | u(2) |
|     for( i = 0; i < 2; i++) | |
|         pps_ref_pic_list_sps_idc[ i ] | u(2) |
|     pps_mvd_l1_zero_idc | u(2) |
|     pps_collocated_from_l0_idc | u(2) |
|     pps_six_minus_max_num_merge_cand_plus1 | ue(v) |
|     pps_max_num_merge_cand_minus_max_num_triangle_cand_plus1 | ue(v) |
|   } | |

TABLE 5-continued

| | Descriptor |
|---|---|
| picture_header_extension_present_flag | u(1) |
| slice_header_extension_present_flag | u(1) |
| pps_extension_flag | u(1) |
| if( pps_extension_flag ) | |
|     while( more_rbsp_data( ) ) | |
|         pps_extension_data_flag | u(1) |
| rbsp_trailing_bits( ) | |
| } | |

With respect to Table 5, JVET-P2001 provides the following semantics:

A PPS RBSP shall be available to the decoding process prior to it being referenced, included in at least one AU with TemporalId less than or equal to the TemporalId of the PPS NAL unit or provided through external means.

All PPS NAL units with a particular value of pps_pic_parameter_set_id within a PU shall have the same content.

pps_pic_parameter_set_id identifies the PPS for reference by other syntax elements. The value of pps_pic_parameter_set_id shall be in the range of 0 to 63, inclusive. PPS NAL units, regardless of the nuh_layer_id values, share the same value space of pps_pic_parameter_set_id.

pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1 or ref_pic_resampling_enabled_flag equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1 or ref_pic_resampling_enabled_flag equal to 0, the value of pic_height_in_luma_samples shall be equal to pic_height_max_in_luma_samples.

Let refPicWidthInLumaSamples and refPicHeightInLumaSamples be the pic_width_in_luma_samples and pic_height_in_luma_samples, respectively, of a reference picture of a current picture referring to this PPS. Is a requirement of bitstream conformance that all of the following conditions are satisfied:

pic_width_in_luma_samples*2 shall be greater than or equal to refPicWidthInLumaSamples.

pic_height_in_luma_samples*2 shall be greater than or equal to refPicHeightInLumaSamples.

pic_width_in_luma_samples shall be less than or equal to refPicWidthInLumaSamples*8.

pic_height_in_luma_samples shall be less than or equal to refPicHeightInLumaSamples*8.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

PicWidthInCtbsY=Ceil(pic_width_in_luma_samples+CtbSizeY)

PicHeightInCtbsY=Ceil(pic_height_in_luma_samples+CtbSizeY)

PicSizeInCtbsY=PicWidthInCtbsY*PicHeightInCtbsY

PicWidthInMinCbsY=pic_width_in_luma_samples/MinCbSizeY

PicHeightInMinCbsY=pic_height_in_luma_samples/MinCbSizeY

PicSizeInMinCbsY=PicWidthInMinCbsY*PicHeightInMinCbsY

PicSizeInSamplesY=pic_width_in_luma_samples*pic_height_in_luma_samples

PicWidthInSamplesC=pic_width_in_luma_samples/SubWidthC

PicHeightInSamplesC=pic_height_in_luma_samples/SubHeightC conformance_window_flag equal to 1 indicates that the conformance cropping window offset parameters follow next in the PPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures in the CLVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of Sub- HeightC*(conf_win_top_offset+conf_win_bottom_offset) shall be less than pic_height_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of conf_win_left_offset, conf_win_right_offset, conf_win_top_offset, and conf_win_bottom_offset, respectively.

scaling_window_flag equal to 1 specifies that the scaling window offset parameters are present in the PPS. scaling_window_flag equal to 0 specifies that the scaling window offset parameters are not present in the PPS. When ref_pic_resampling_enabled_flag is equal to 0, the value of scaling_window_flag shall be equal to 0.

scaling_win_left_offset, scaling_win_right_offset, scaling_win_top_offset, and scaling_win_bottom_offset specify the offsets, in units of luma samples, that are applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The value of scaling_win_left_offset+scaling_win_right_offset shall be less than pic_width_in_luma_samples, and the value of scaling_win_top_offset+scaling_win_bottom_offset shall be less than pic_height_in_luma_samples.

The variables PicOutputWidthL and PicOutputHeightL are derived as follows:

PicOutputWidth$L$=pic_width_in_luma_samples−
(scaling_win_right_offset+scaling_win_left_offset)

PicOutputHeight$L$=pic_height_in_luma_samples−
(scaling_win_bottom_offset+scaling_win_top_offset)

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

mixed_nalu_types_in_pic_flag equal to 1 specifies that each picture referring to the PPS has more than one VCL NAL unit and that the VCL NAL units do not have the same value of nal_unit_type and that the picture is not an IRAP picture. mixed_nalu_types_in_pic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding subpic_treated_as_pic_flag[i] is equal to 1.

The slice shall not belong to a subpicture of picA containing VCL NAL units with nal_unit_type not equal to nalUnitTypeA.

For all the following PUs in the CLVS in decoding order, neither RefPicList[0] nor RefPicList[1] of a slice in subpicA shall include any picture preceding picA in decoding order in an active entry.

pps_subpic_ids_ignalling_present_flag equal to 1 specifies that subpicture ID mapping is signalled in the PPS. pps_subpic_id_signalling_present_flag equal to 0 specifies that subpicture ID mapping is not signalled in the PPS. When sps_subpic_id_present_flag is 0 or sps_subpic_id_signalling_present_flag is equal to 1, pps_subpic_id_signalling_present_flag shall be equal to 0.

pps_num_subpics_minus1 plus 1 specifies the number of subpictures in the coded pictures referring to the PPS. It is a requirement of bitstream conformance that the value of pps_num_subpic_minus1 shall be equal to sps_num_subpics_minus1.

pps_subpic_id_len_minus1 plus 1 specifies the number of bits used to represent the syntax element pps_subpic_id[i]. The value of pps_subpic_id_len_minus1 shall be in the range of 0 to 15, inclusive.

It is a requirement of bitstream conformance that the value of pps_subpic_id_len_minus1 shall be the same for all PPSs that are referred to by coded pictures in a CLVS.

pps_subpic_id[i] specifies the subpicture ID of the i-th subpicture. The length of the pps_subpic_id[i] syntax element is pps_subpic_id_len_minus1+1 bits.

no_pic_partition_flag equal to 1 specifies that no picture partitioning applied to each picture referring to the PPS. no_pic_partition_flag equal to 0 specifies each picture referring to the PPS may be partitioned into more than one tile or slice.

It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 shall be equal to sps_log 2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 shall be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of CTBs for i in the range of 0 to num_exp_tile_columns_minus1−1, inclusive. tile_column_width_minus1[num_exp_tile_columns_minus1] is used to derive the width of the tile columns with index greater than or equal to num_exp_tile_columns_minus1 as specified below. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified below. When not present, the value of tile_row_height_minus1[0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpics_present_flag is equal to 1, the value of rect_slice_flag shall be equal to 1.

single_slice_per_subpic_flag equal to 1 specifies that each subpicture consists of one and only one rectangular slice. single_slice_per_subpic_flag equal to 0 specifies that each subpicture may consist one or more rectangular slices. When subpics_present_flag is equal to 0, single_slice_per_subpic_flag shall be equal to 0. When single_slice_per_subpic_flag is equal to 1, num_slices_in_pic_minus1 is inferred to be equal to sps_num_subpics_minus1.

num_slices_in_pic_minus1 plus 1 specifies the number of rectangular slices in each picture referring to the PPS. The value of num_slices_in_pic_minus1 shall be in the range of 0 to MaxSlicesPerPicture−1, inclusive, where MaxSlicesPerPicture is specified. When no_pic_partition_flag is equal to 1, the value of num_slices_in_pic_minus1 is inferred to be equal to 0.

tile_idx_delta_present_flag equal to 0 specifies that tile_idx_delta values are not present in the PPS and that all rectangular slices in pictures referring to the PPS are specified in raster order according to the process defined in below. tile_idx_delta_present_flag equal to 1 specifies that tile_idx_delta values may be present in the PPS and that all rectangular slices in pictures referring to the PPS are specified in the order indicated by the values of tile_idx_delta.

slice_width_in_tiles_minus1[i] plus 1 specifies the width of the i-th rectangular slice in units of tile columns. The value of slice_width_in_tiles_minus1[i] shall be in the range of 0 to NumTileColumns−1, inclusive. When not present, the value of slice_width_in_tiles_minus1[i] is inferred as specified below.

slice_height_in_tiles_minus1[i] plus 1 specifies the height of the i-th rectangular slice in units of tile rows. The value of slice_height_in_tiles_minus1[i] shall be in the range of 0 to NumTileRows−1, inclusive. When not present, the value of slice_height_in_tiles_minus[i] is inferred as specified below. num_slices_in_tile_minus1[i] plus 1 specifies the number of slices in the current tile for the case where the i-th slice contains a subset of CTU rows from a single tile. The value of num_slices_in_tile_minus1[i] shall be in the range of 0 to RowHeight[tileY]−1, inclusive, where tileY is the tile row index containing the i-th slice. When not present, the value of num_slices_in_tile_minus1[i] is inferred to be equal to 0.

slice_height_in_ctu_minus1[i] plus 1 specifies the height of the i-th rectangular slice in units of CTU rows for the case where the i-th slice contains a subset of CTU rows from a single tile. The value of slice_height_in_ctu_minus1[i] shall be in the range of 0 to RowHeight[tileY]−1, inclusive, where tileY is the tile row index containing the i-th slice.

tile_idx_delta[i] specifies the difference in tile index between the i-th rectangular slice and the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0.

loop_filter_across_tiles_enable_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

entropy_coding_sync_enabled_flag equal to 1 specifies that a specific synchronization process for context variables is invoked before decoding the CTU that includes the first CTB of a row of CTBs in each tile in each picture referring to the PPS, and a specific storage process for context variables is invoked after decoding the CTU that includes the first CTB of a row of CTBs in each tile in each picture referring to the PPS. entropy_coding_sync_enabled_flag equal to 0 specifies that no specific synchronization process for context variables is required to be invoked before decoding the CTU that includes the first CTB of a row of CTBs in each tile in each picture referring to the PPS, and no specific storage process for context variables is required to be invoked after decoding the CTU that includes the first CTB of a row of CTBs in each tile in each picture referring to the PPS.

It is a requirement of bitstream conformance that the value of entropy_oding_sync_enabled_flag shall be the same for all PPSs that are referred to by coded pictures within a CLVS.

When entry_point_offsets_present_flag is equal to 1, the variable NumEntryPoints, which specifies the number of entry points in the current slice, is derived as follows:

```
NumEntryPoints = 0
for( i = 1; i < NumCtuInCurrSlice; i++ ) {
    CtbAddrInRs = CtbAddrInCurrSlice[ i ]
    CtbAddrX = ( CtbAddrInRs % PicWidthInCtbsY )
    CtbAddrY = ( CtbAddrInRs / PicWidthInCtbsY )
    if( CtbAddrX == CtbToTileColBd[ CtbAddrX ] &&
        ( CtbAddrY = = CtbToTileRowBd[ CtbAddrY ] | |
    entropy_coding_sync_enabled_flag ) )
        NumEntryPoints++
}
``` cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in slice headers. rpl1_idx_present_flag equal to 1 specifies that ref_pic_list_sps_flag[1] and ref_pic_list_idx[1] may be present in slice headers.

init_qp_minus26 plus 26 specifies the initial value of SliceQp$_Y$ for each slice referring to the PPS. The initial value of SliceQp$_Y$ is modified at the slice layer when a non-zero value of slice_qp_delta is decoded. The value of init_qp_minus26 shall be in the range of −(26+ QpBdOffset) to +37, inclusive.

log 2_transform_skip_max_size_minus2 specifies the maximum block size used for transform skip, and shall be in the range of 0 to 3, inclusive.

The variable MaxTsSize is set equal to 1<<(log 2_transform_skip_max_size_minus2+2).

cu_qp_delta_enabled_flag equal to 1 specifies that the pic_cu_qp_delta_subdiv_intra_slice and pic_cu_qp_delta_subdiv_inter_slice syntax elements are present in PHs referring to the PPS and that cu_qp_delta_abs may be present in the transform unit syntax. cu_qp_delta_enabled_flag equal to 0 specifies that the pic_cu_qp_delta_subdiv_intra_slice and pic_cu_qp_delta_subdiv_inter_slice syntax elements are not present in PHs referring to the PPS and that cu_qp_delta_abs is not present in the transform unit syntax.

pps_cb_qp_offset and pps_cr_qp_offset specify the offsets to the luma quantization parameter Qp'$_Y$ used for deriving Qp'$_{Cb}$ and Qp'$_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_joint_cbcr_qp_offset_present_flag equal to 1 specifies that pps_joint_cbcr_qp_offset_value and joint_cbcr_qp_offset_list[i] are present in the PPS RBSP syntax structure. pps_joint_cbcr_qp_offset_present_flag equal to 0 specifies that pps_joint_cbcr_qp_offset_value and joint_cbcr_qp_offset_list[i] are not present in the PPS RBSP syntax structure. When ChromaArrayType is equal to 0 or sps_joint_cbcr_enabled_flag is equal to 0, the value of pps_joint_cbcr_qp_offset_present_flag shall be equal to 0.

pps_joint_cbcr_qp_offset_value specifies the offset to the luma quantization parameter Qp'$_Y$ used for deriving Qp'$_{CbCr}$. The value of pps_joint_cbcr_qp_offset_value shall be in the range of −12 to +12, inclusive. When ChromaArrayType is equal to 0 or sps_joint_cbcr_enabled_flag is equal to 0, pps_joint_cbcr_qp_offset_value is not used in the decoding process and decoders shall ignore its value. When pps_joint_cbcr_qp_offset_present_flag is equal to 0, pps_joint_cbcr_qp_offset_value is not present and is inferred to be equal to 0.

pps_slice_chroma_qp_offsets_present_flag equal to 1 indicates that the slice_cb_qp_offset and slice_cr_qp_offset syntax elements are present in the associated slice headers. pps_slice_chroma_qp_offsets_present_flag equal to 0 indicates that these syntax elements are not present in the associated slice headers. When ChromaArrayType is equal to 0, pps_slice_chroma_gp_offsets_present_flag shall be equal to 0.

pps_cu_chroma_qp_offset_list_enabled_flag equal to 1 specifies that the pic_cu_chroma_qp_offset_subdiv_intra_slice and pic_cu_chroma_qp_offset_subdiv_inter_slice syntax elements are present in PHs referring to the PPS and that cu_chroma_qp_offset_flag may be present in the transform unit syntax and the palette coding syntax. pps_cu_chroma_qp_offset_list_enabled_flag equal to 0 specifies that the pic_cu_chroma_qp_offset_subdiv_intra_slice and pic_cu_chroma_qp_offset_subdiv_inter_slice syntax elements are not present in PHs referring to the PPS and that the cu_chroma_qp_offset_flag is not present in the transform unit syntax and the palette coding syntax. When ChromaArrayType is equal to 0, it is a requirement of bitstream conformance that the value of pps_cu_chroma_qp_offset_list_enabled_flag shall be equal to 0.

chroma_qp_offset_list_len_minus1 plus 1 specifies the number of cb_qp_offset_list[i], cr_qp_offset_list[i], and joint_cbcr_qp_offset_list[i], syntax elements that are present in the PPS RBSP syntax structure. The value of chroma_qp_offset_list_len_minus1 shall be in the range of 0 to 5, inclusive.

cb_qp_offset_list[i], cr_qp_offset_list[i], and joint_cbcr_qp_offset_list[i], specify offsets used in the derivation of Qp'$_{Cb}$, Qp'$_{Cr}$, and Qp'$_{CbCr}$, Respectively. The Values of cb_qp_offset_list[i], cr_qp_offset_list[i], and joint_cbcr_qp_offset_list[i] shall be in the range of −12 to +12, inclusive. When pps_joint_cbcr_qp_offset_present_flag is equal to 0, joint_cbcr_qp_offset_list[i] is not present and it is inferred to be equal to 0.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of pic_deblocking_filter_override_flag in the PHs referring to the PPS or slice_deblocking_filter_override_flag in the slice headers referring to the PPS. deblocking_filter_override_enabled_flag equal to 0 specifies the absence of pic_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied for slices referring to the PPS, unless the default deblocking parameter offsets are overridden by the deblocking parameter offsets present in the slice headers of the slices referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

constant_slice_headerparams_enabled_flag equal to 0 specifies that pps_dep_quant_enabled_ide, pps_ref_pic_list_sps_idc[i], pps_mvd_l1_zero_idc, pps_collocated_from_l0_ide, pps_six_minus_max_num_merge_cand_plus1, and pps_max_num_merge_cand_minus_max_num_triangle_cand_plus1 are inferred to be equal to 0. constant_slice_header_params_enabled_flag equal to 1 specifies that these syntax elements are present in the PPS.

pps_dep_quant_enabled_ide equal to 0 specifies that the syntax element pic_dep_quant_enabled_flag is present in PHs referring to the PPS. pps_dep_quant_enabled_ide equal to 1 or 2 specifies that the syntax element pic_dep_quant_enabled_flag is not present in PHs referring to the PPS. pps_dep_quant_enabled_ide equal to 3 is reserved for future use by ITU-T|ISO/IEC.

pps_ref_pic_list_sps_idc[i] equal to 0 specifies that the syntax element pic_rpl_sps_flag[i] is present in PHs referring to the PPS or slice_rpl_sps_flag[i] is present in slice header referring to the PPS. pps_ref_pic_list_sps_idc[i] equal to 1 or 2 specifies that the syntax element pic_rpl_sps_flag[i] is not present in PHs referring to the PPS and slice_rpl_sps_flag[i] is not present in slice header referring to the PPS. pps_ref_pic_list_sps_idc[i] equal to 3 is reserved for future use by ITU-T j ISO/IEC.

pps_mvd_l1_zero_idc equal to 0 specifies that the syntax element mvd_l1_zero_flag is present in PHs referring to the PPS. pps_mvdl1_zero_ide equal to 1 or 2 specifies that mvd_l1_zero_flag is not present in PHs referring to the PPS. pps_mvd_l1_zero_idc equal to 3 is reserved for future use by ITU-T|ISO/IEC.

pps_collocated_from_l0_idc equal to 0 specifies that the syntax element collocated_from_l0_flag is present in slice header of slices referring to the PPS. pps_collocated_from_l0_ide equal to 1 or 2 specifies that the syntax element collocated_from_l0_flag is not present in slice header of slices referring to the PPS. pps_collocated_from_l0_idc equal to 3 is reserved for future use by ITU-T|ISO/IEC.

pps_six_minus_max_num_merge_cand_plus1 equal to 0 specifies that pic_six_minus_max_num_merge_cand is present in PHs referring to the PPS. pps_six_minus_max_num_merge_cand_plus1 greater than 0 specifies that pic_six_minus_max_num_merge_cand is not present in PHs referring to the PPS. The value of pps_six_minus_max_num_merge_cand_plus1 shall be in the range of 0 to 6, inclusive.

pps_max_num_merge_cand_minus_max_num_triangle_cand_plus1 equal to 0 specifies that pic_max_num_merge_cand_minus_max_num_triangle_cand is present in PHs of slices referring to the PPS. pps_max_num_merge_cand_minus_max_num_triangle_cand_plus1 greater than 0 specifies that pic_max_num_merge_cand_minus_max_num_triangle_cand is not present in PHs referring to the PPS. The value of pps_max_num_merge_cand_minus_max_num_triangle_cand_plus1 shall be in the range of 0 to MaxNumMergeCand−1.

picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification.

slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag shall be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements As provided above, the SPS in JVET-P2001 includes syntax element ref_pic_resampling_enabled_flag which specifies whether reference picture resampling may be applied, and sytnax elements pic_width_max_in_luma_samples and pic_height_max_in_luma_samples which respectively specify a maximum width and height of each decoded picture referring to the SPS. Further, the PPS in JVET-P2001 includes syntax elements pic_width_in_luma_samples and pic_height_in_luma_samples which respectively specify the width and height of each decoded picture referring to the PPS. Thus, in JVET-P2001, since decoded pictures in a SPS may refer to different PPSs, output resolution of decoded pictures within a CVS may change. That is, in JVET-P2001, so-called reference picture resampling (RPS) is supported.

It should be noted that in ITU-T H.264 and ITU-T H.265, output resolution of decoded pictures was allowed to change at the start of a new CVS using an IDR picture that flushes the DPB (or in some cases another type of IRAP picture that also flushes the DPB when starting a new CVS). In JVET-P2001, the output resolution of decoded pictures can change at any picture in a CVS, and multiple pictures of different resolution may be present in the DPB at the same time. Further, it should be noted that in typically cases, output pictures will still be intended to be displayed in the same resolution, regardless of multiple pictures of different resolution being present in the DPB at the same time. Further, the output resolution does not have to be the same as the source resolution e.g., 1080p video decoded and displayed on a 4K screen.

Video rendering devices are expected to support transitions from one resolution to another (at IDR pictures) in existing video coding standards. However, some receivers and players have difficulties in supporting resolution transitions without introducing visual artifacts. For example, a few black frames may be inserted at a transition or frames with incorrect scaling or aspect ratio may occur at a transition.

It should be noted that that ITU-T H.264 merely provides the following with respect to resolution transitions:

When the IDR picture is not the first IDR picture decoded and the value of PicWidthInMbs or FrameHeightInMbs or max_dec_frame_buffering derived from the active sequence parameter set is different from the value of PicWidthInMbs or FrameHeightInMbs or max_dec_frame_buffering derived from the sequence parameter set that was active for the preceding picture, respectively, no_output_of_prior_pics_flag is inferred to be equal to 1 by the HRD, regardless of the actual value of no_output_of_prior_pics_flag.

NOTE—Decoder implementations should try to handle changes in the value of PicWidthInMbs or FrameHeightInMbs or max_dec_frame_buffering more gracefully than the HRD.

Thus, decoders conforming to ITU-T H.264 (and similarly, decoders conforming to ITU-T H.265) are not required to handle resolutions switch gracefully. That is, for example, in a manner that does not introduce visually artifacts.

It should be noted that in many video applications and processing stages a video with active content of 1920×1080 is stored and processed as 1920×1088 while in other applications and processing stages the video is stored and processed as 1920×1080. Thus, a video coding standard should have support for both of these operating modes without assuming that one of these modes is always used. Further, in order to properly set up memory allocations, rescaling and cropping configuration, and display areas, it is important for video decoders to determine the intended display resolution (or handover resolution) at the start of decoding a bitstream (that is, for example, before decoding a VCL NAL unit for any pictures in the bitstream). However, in JVET-P2001, since the output resolution of decoded pictures is in the PPS and can change from one picture to another, a video decoder, at most, can determine the intended display resolution for each picture referring to a PPS after decoding the corresponding PPS. It should be noted that in ITU-T H.265, video usability information (VUI) parameters, vui_parameters( ), include default display window parameter syntax elements which identify the area that is within the conformance cropping window and that is suggested to be displayed in the absence of any alternative indication (provided within the bitstream or by external means not specified in this Specification) of preferred display characteristics. As described in further detail below, indicating a default display window using default display window parameter syntax elements may be less than ideal.

Figure 4A:
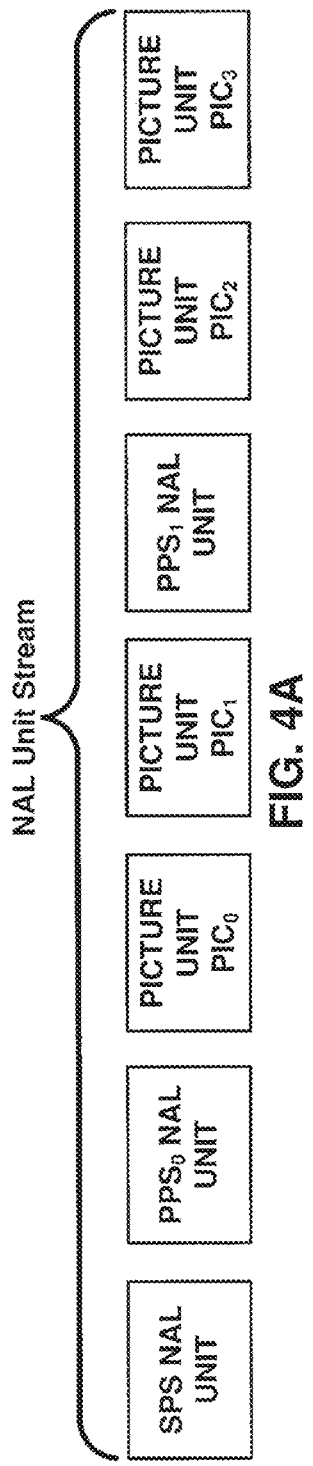
FIG. 4A is a conceptual diagram illustrating coded video data and corresponding data structures in accordance with one or more techniques of this disclosure.
Figure 4B:
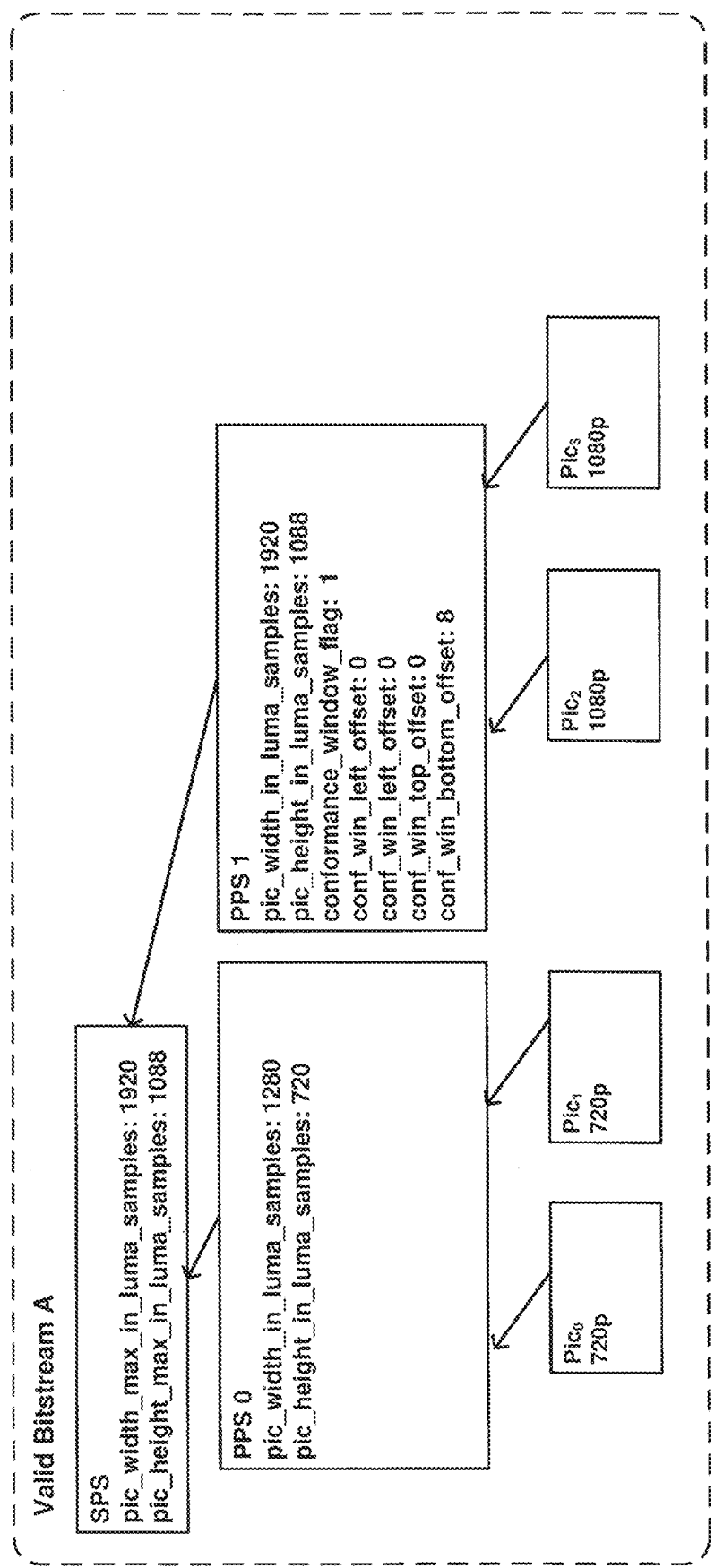
FIG. 4B is a conceptual diagram illustrating coded video data and corresponding data structures in accordance with one or more techniques of this disclosure.
Figure 4C:
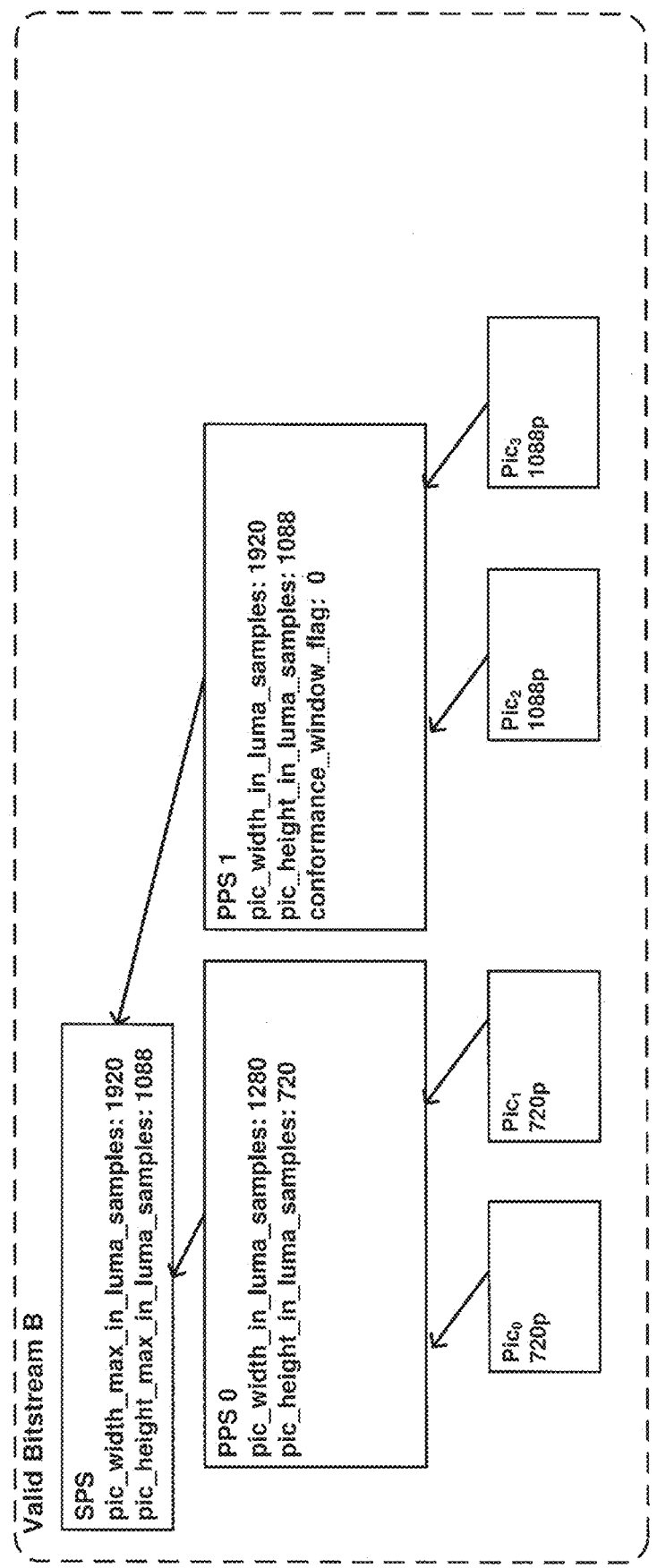
FIG. 4C is a conceptual diagram illustrating coded video data and corresponding data structures in accordance with one or more techniques of this disclosure.
Figure 5:
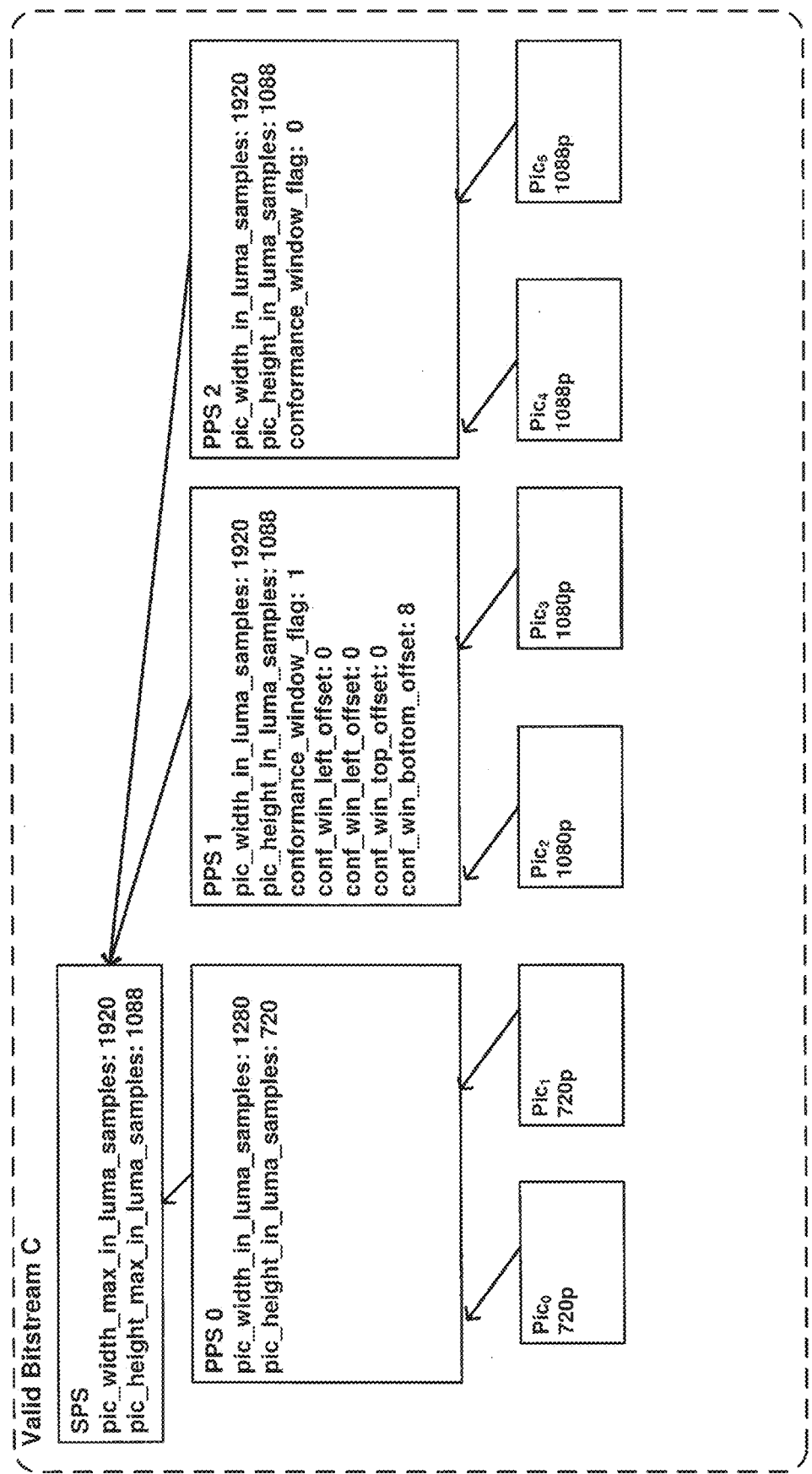
FIG. 5 is a conceptual diagram illustrating coded video data and corresponding data structures in accordance with one or more techniques of this disclosure.

In one example, according to JVET-P2001, a bitstream may be coded with an SPS indicating pic_width_max_in_luma_samples is equal to 1920 and pic_height_max_in_luma_samples is equal to 1088, a first PPS may indicate that the first pictures (e.g., $Pic_0$ and $Pic_1$) in the bitstream have pic_width_in_luma_samples equal to 1280 and pic_height_max_in_luma_samples equal to 720. The bitstream may further include a second PPS indicating the resolution of subsequent pictures (e.g., $Pic_2$ and $Pic_3$). FIG. 4A illustrates an example of a NAL unit stream corresponding to the bitstream in this example. As illustrated in FIGS. 4B-4C, in this case, a video decoder cannot determine the intended display resolution of $Pic_2$ and $Pic_3$ until the second PPS is parsed. That is, for example, even with pic_height_in_luma_samples in the second PPS being equal to 1088 for both the example in FIG. 4B and FIG. 4C, the intended display resolution of $Pic_2$ and $Pic_3$ may be 1920×1080 or 1920×1088 based on whether there is a cropping window or not. Thus, a decoder is not able to determine that Bitstream A and Bitstream B have different intended display resolutions until conformance window syntax elements in the second PPS are parsed. FIG. 5 further illustrates how long it may take a decoder to determine an intended output resolution. That is, FIG. 5 provide an example in which there are both pictures of height 1080 and pictures of height 1088 in the same CVS.

Thus, the signaling of picture resolutions in JVET-P2001 is less than ideal. In particular, according to JVET-P2001, conforming bitstreams may be generated, which do not indicate an intended display resolution in such a manner that a video decoder can make a resolution transition without introducing or minimizing visual artifacts.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 6:
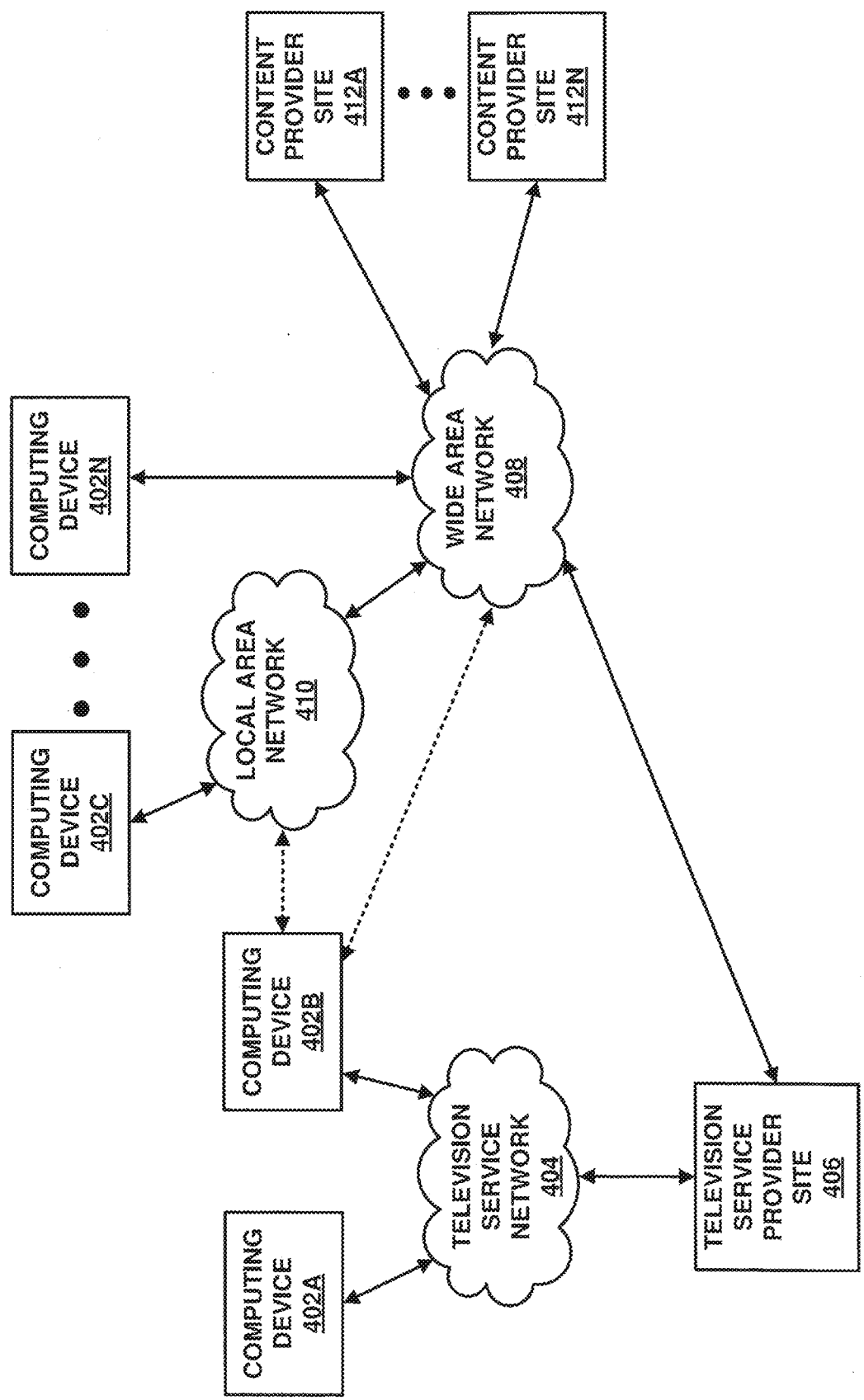
FIG. 6 is a conceptual drawing illustrating an example of components that may be included in an implementation of a system that may be configured to encode and decode video data according to one or more techniques of this disclosure.

FIG. 6 is a conceptual drawing illustrating an example of components that may be included in an implementation of system 100. In the example implementation illustrated in FIG. 6, system 100 includes one or more computing devices 402A-402N, television service network 404, television service provider site 406, wide area network 408, local area network 410, and one or more content provider sites 412A-412N. The implementation illustrated in FIG. 6 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 6, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 6, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 6, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 6, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 7:
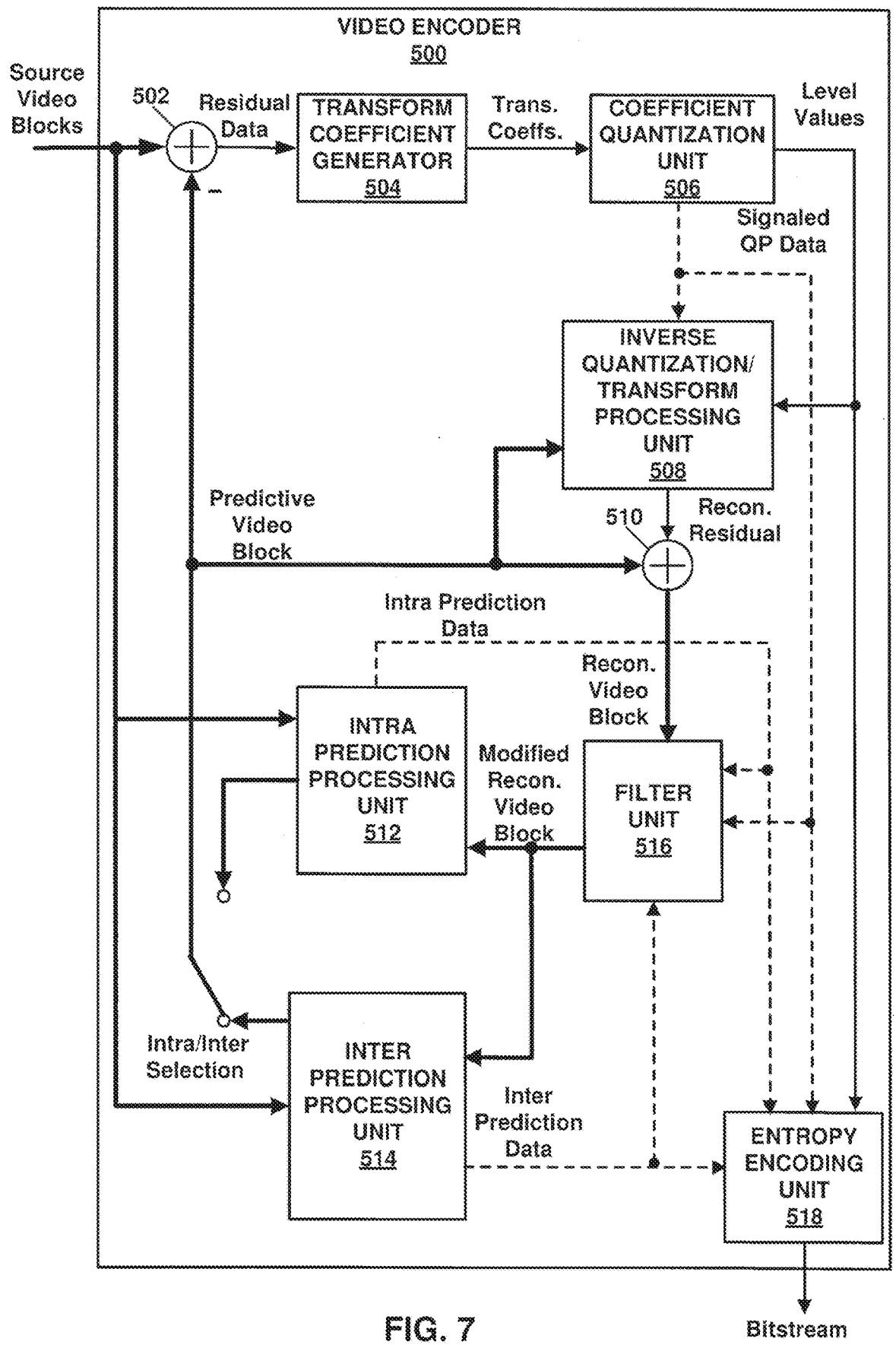
FIG. 7 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 7 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 7, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional subdivisions of source video blocks. It should be noted that the techniques described herein are generally applicable to video coding, regardless of how source video data is partitioned prior to and/or during encoding. In the example illustrated in FIG. 7, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 7, video encoder 500 receives source video blocks and outputs a bitstream.

In the example illustrated in FIG. 7, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or subdivisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 7, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 7, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 7, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 7, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 7). It should be noted that inter prediction processing unit 514 may further be configured to apply one or more interpolation filters to a reconstructed residual block to calculate subinteger pixel values for use in motion estimation. Inter prediction processing unit 514 may output motion prediction data for a calculated motion vector to entropy encoding unit 518.

Referring again to FIG. 7, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 7, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 6.

As described above, the signaling of picture resolutions in JVET-P2001 is less than ideal. As further described above, a bitstream may consist of several CVSs in which some, for example, have a resolution of 1920×1080 and some have a resolution of 1280×720. When preparing the CVSs for encoding it is typical (and sometimes necessary) to set a level indication and pic_width_max_in_luma_samples and pic_height_max_in_luma_samples to the actual values of the coded resolution. For example, bitstreams may be encoded at different resolutions for delivery with Adaptive Bit Rate (ABR) streaming techniques, such as, for example Dynamic Adaptive Streaming over Http (DASH). In this case, several versions of the same segment is encoded at different resolutions and each resolution is indicated with a different level, even though all versions are intended to be displayed at the same resolution. When splicing together these CVSs into the same bitstream, it is desirable to indicate that all pictures are intended to be displayed at the same resolution, for example, for the case above, 1920×1080. That is, so that no reinitialization of the display area or change of the actual display area will occur at the CVS boundary.

In one example, according to the techniques herein, parameters for intended display resolution may be included in a DPS. It should be noted that in some cases it may be assumed that within the same bitstream the intended display resolution will not change even if the coded resolution changes from one CVS to another CVS or if the resolution changes within a CVS (with RPR). Table 6 illustrates an example of a decoding parameter set syntax structure for indicating an intended display resolution, according to the techniques herein.

TABLE 6

| | Descriptor |
|---|---|
| decoding_parameter_set_rbsp( ) { | |
|   dps_decoding_parameter_set_id | u(4) |
|   dps_max_sublayers_minus1 | u(3) |
|   dps_reserved_zero_5bits | u(5) |
|   dps_num_ptls_minus1 | u(4) |
|   for( i = 0; i <= dps_num_ptls_minus1; i++ ) | |
|     profile_tier_level( 1, dps_max_sublayers_minus1 ) | |
|   intended_display_width_in_luma_samples | u(16) |
|   intended_display_height_in_luma_samples | u(16) |
|   dps_extension_flag | u(1) |
|   if( dps_extension_flag ) | |
|     while( more_rbsp_data( ) ) | |
|       dps_extension_data_flag | u(1) |
|   rbsp_trailing_bits( ) | |
| } | |

With respect to Table 6, the semantics may be based on the semantics provided above with respect to Table 3, for syntax elements intended_display_width_in_luma_samples and intended_display_height_in_luma_samples, in one example, the following semantics may be used:

intended_display_width_in_luma_samples specifies the intended display width, in units of luma samples, of each cropped decoded picture referring to the DPS.

intended_display_height_in_luma_samples specifies the intended display height, in units of luma samples, of each cropped decoded picture referring to the DPS.

NOTE—The intended display width and intended display height provide guidance for the width, height and aspect ratio to which the cropped decoded pictures are intended to be mapped. When the intended display width and height is different from the coded display width and height, a resampling process may be applied to the cropped decoded picture but no specific resampling method is mandated or suggested. The intended display width and intended display height does not impose any constraints on the coded picture width and coded picture heights as expressed by pic_width_in_luma_samples and pic_height_in_luma_samples, respectively.

In one example, syntax elements, intended_display_width_in_luma_samples and intended_display_height_in_luma_samples may signaled using variable length code (e.g. ue(v)) instead of fixed length code. In another example, syntax elements intended_display_width_in_luma_samples and intended_display_height_in_luma_samples may instead be signaled in the SPS or in a VUI or in a SEI message. As described above, in ITU-T H.265, vui_parameters( ) includes default display window parameter syntax elements which identify the area that is within the conformance cropping window and that is suggested to be displayed in the absence of any alternative indication of preferred display characteristics. It should be noted that in ITU-T H.265, the default display window parameter syntax elements, def_disp_win_left_offset, def_disp_win_right_offset, def_disp_win_top_offset, and def_disp_win_bottom_offset, identify the area that is within the conformance cropping window as offsets with respect to values provided by conf_win_left_offset, conf_win_right_offset, conf_win_top_offset, and conf_win_bottom_offset. Thus, in the vui_parameters( ) in ITU-T H.265 the default display window parameter syntax elements identify a default display window in an indirect manner. That is, in order to determine the default display window syntax elements conf_win_left_offset, conf_win_right_offset, conf_win_top_offset, and conf_win_bottom_offset, which are conditionally present, and def_disp_win_left_offset, def_disp_win_right_offset, def_disp_win_top_offset, and def_disp_win_bottom_offset must be parsed. When intended_display_width_in_luma_samples and intended_display_height_in_luma_samples are signaled in the SPS or in a VUI or in a SEI message, these two syntax elements alone provide the size of the intended display, which may be more efficient.

In one example, according to the technique herein, a flag may be signaled in the SPS indicating whether the intended display width and height are respectively equal to the width specified by pic_width_max_in_luma_samples and the height specified by pic_width_max_in_luma_samples. Tables 7A-7C, illustrate examples, according to the techniques herein, where a flag is signaled in the SPS indicating whether the intended display width and height are respectively equal to the width specified by pic_width_max_in_luma_samples and the height specified by pic_width_max_in_luma_samples.

TABLE 7A

| | Descriptor |
|---|---|
| seq_parameter_set_rbsp( ) { | |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps max sublayers minus 1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   if(ref_pic_resampling_enabled_flag) { | |
|     intended_display_equal_max_display_flag | u(1) |
|     if(!intended_display_equal_max_display_flag) { | |
|       intended_display_width | ue(v) |
|       intended_display_height | ue(v) |
|     } | |
|   } | |
| ... | |
| } | |

TABLE 7B

| | Descriptor |
|---|---|
| seq_parameter_set_rbsp( ) { | |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_ sublayers_minus1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
|   pic_width_max_in_luma_samples | ue(v) |

TABLE 7B-continued

| | Descriptor |
|---|---|
| pic_height_max_in_luma_samples | ue(v) |
| intended_display_equal_max_display_flag | u(1) |
| if(!intended_display_equal_max_display_flag ) { | |
|     intended_display_width | ue(v) |
|     intended_display_height | ue(v) |
| } | |
| ... | |
| } | |

TABLE 7C

| | Descriptor |
|---|---|
| seq_parameter_set_rbsp( ) { | |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   intended_display_equal_max_display_flag | u(1) |
| ... | |
| } | |

With respect to Tables 7A-7C, the semantics may be based on the semantics provided above with the following semantics provided for syntax elements intended_display_equal_max_isplay_flag, intended_display_width_offset, and intended_display_height_offset:

intended_display_equal_max_display_flag equal to 1 specifies that the intended display width, in units of luma samples, is equal to the width specified by pic_width_max_in_luma_samples and the intended display height, in units of luma samples, is equal to the height specified by pic_height_max_in_luma_samples.

intended_display_width specifies the intended display width, in units of luma samples, of each cropped decoded picture referring to the SPS.

intended_display_height specifies the intended display height, in units of luma samples, of each cropped decoded picture referring to the SPS.

NOTE—The intended display width and intended display height provide guidance for the width, height and aspect ratio to which the cropped decoded pictures are intended to be mapped. When the intended display width and height is different from the coded display width and height, a resampling process may be applied to the cropped decoded picture but no specific resampling method is mandated or suggested. The intended display width and intended display height does not impose any constraints on the coded picture width and coded picture heights as expressed by pic_width_in_luma_samples and pic_height_in_luma_samples, respectively.

It should be noted that in the example provide with respect to Table 7C, the the intended display width and intended display height may be provided in another syntax structure, e.g., a DPS.

Further, it should be noted that in one example, syntax elements intended_display_width and intended_display_height may be replaced with intended_display_width_offset and intended_displayjheight_offset, where these syntax elements have semantics based on the following:

intended_display_width_offset specifies the intended display width, in units of luma samples, of each cropped decoded picture referring to the SPS.

intended_display_width_in_luma_samples=pic_width_max_in_luma_samples−intended_display_width_offset.

intended_display_height_offset specifies the intended display height, in units of luma samples, of each cropped decoded picture referring to the SPS.

intended_display_height_in_luma_samples=pic_height_max_in_luma_samples−intended display_height_offset.

Table 8 illustrates another example of a decoding parameter set syntax structure for indicating an intended display resolution, according to the techniques herein. It should be noted that in Table 8, syntax elements intended_display_width_in_luma_samples and intended_display_height_in_luma_samples are conditionally signaled based on a flag.

TABLE 8

| | Descriptor |
|---|---|
| decoding_parameter_set_rbsp( ) { | |
|   dps_decoding_parameter_set_id | u(4) |
|   dps_max_sublayers_minus1 | u(3) |
|   dps_reserved_zero_5bits | u(5) |
|   dps_num_ptls_minus1 | u(4) |
|   for( i = 0; i <= dps_num_ptls_minus1; i++ ) | |
|     profile_tier_level( 1, dps_max_sublayers_minus1 ) | |
|   intended_display_info_present_flag | u(1) |
|   if(intended_display_info_present_flag) { | |
|     intended_display_width_in_luma_samples | u(16) |
|     intended_display_height_in_luma_samples | u(16) |
|   } | |
|   dps_extension_flag | u(1) |
|   if( dps_extension_flag ) | |
|     while( more_rbsp_data( ) ) | |
|       dps_extension_data_flag | u(1) |
|   rbsp_trailing_bits( ) | |
| } | |

With respect to Table 8, the semantics may be based on the semantics provided above with respect to Table 3, for syntax elements intended_display_info_present_flag, intended_display_width_in_luma_samples, and intended_display_height_in_luma_samples, in one example, the following semantics may be used:

intended_display_info_present_flag equal to 1 specifies that intended display width (intended_display_width_in_luma_samples) and intended display height (intended_display_height_in_luma_samples), syntax elements are present in the DPS. intended_display_info_present_flag equal to 0 specifies that intended display width (intended_display_width_in_luma_samples) and intended display height (intended_display_height_in_luma_samples), syntax elements are not present in the DPS.

intended_display_width_in_luma_samples specifies the intended display width, in units of luma samples, of each cropped decoded picture referring to the DPS.

intended_display_height_in_luma_samples specifies the intended display height, in units of luma samples, of each cropped decoded picture referring to the DPS.

NOTE—The intended display width and intended display height provide guidance for the width, height and aspect ratio to which the output pictures are intended to be mapped. The intended display width and intended display height does not impose any constraints on the coded picture width and coded picture heights as expressed by pic_width_in_luma_samples and pic_height_in_luma_samples, respectively.

In an example, the term "cropped decoded picture" may be replaced with the term "cropped picture" or the term "decoded picture."

In another example, according to the techniques herein, cropping window parameters for intended display resolution may be included in a SPS. Table 9 illustrates an example of the relevant portion of a sequence parameter set syntax structure for indicating an intended display resolution, according to the techniques herein.

TABLE 9

| | Descriptor |
|---|---|
| seq_parameter_set_rbsp( ) { | |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   ... | |
| } | |

With respect to Table 9, the semantics may be based on the semantics provided above with respect to Table 4, for syntax elements sps_conformance_window_flag, sps_conf_win_left_offset, sps_conf_win_right_offset, sps_conf_win_top_offset, and sps_conf_win_bottom_offset, in one example, the following semantics may be used:

sps_conformance_window_flag equal to 1 indicates that the conformance cropping window offset parameters follow next in the SPS. conformance_window_flag equal to 0 indicates that the conformance cropping window offset parameters are not present.

sps_conf_win_left_offset, sps_conf_win_right_offset, sps_conf_win_top_offset, and sps_conf_win_bottom_offset specify the cropping window that is applied to pictures with pic_width_in_luma_samples equal to pic_width_max_in_luma_samples and pic_height_in_luma_samples equal to pic_height_max_in_luma_samples. When conformance_window_flag is equal to 0, the values of sps_conf_win_left_offset, sps_conf_win_right_offset, sps_conf_win_top_offset, and sps_conf_win_bottom_offset are inferred to be equal to 0.

It should be noted that in the case when sps_conformance_window_flag, sps_conf_win_left_offset, sps_conf_win_right_offset, sps_conf_win_top_offset, and sps_conf_win_bottom_offset are included in an SPS, respective syntax elements conformance_window_flag, conf_win_left_offset, conf_win_right_offset, conf_win_top_offset, and conf_win_bottom_offset in the PPS may be renamed as follows: pps_conformance_window_flag, pps_conf_win_left_offset, pps_conf_win_right_offset, pps_conf_win_top_offset, and pps_conf_win_bottom_offset. Further, the following may be added to the semantics of the PPS:

When pic_width_in_luma_samples is equal to pic_width_max_in_luma_samples and pic_height_in_luma_samples is equal to pic_height_max_in_luma_samples, it is a requirement of bitstream conformance that, pps_conf_win_left_offset, pps_conf_win_right_offset, pps_conf_win_top_offset, and pps_conf_win_bottom_offset, are equal to sps_conf_win_left_offset, sps_conf_win_right offset, sps_conf_win_top_offset, and sps_conf_win_bottom_offset, respectively.

As described above, a video coding standard should provide mechanisms where changes in resolution can be handled in manner such that the introduction of artifacts is minimized (or eliminated), regardless if the resolution change occurs at a picture that starts a new CVS or if the resolution change occurs in the middle of a CVS. It should be noted, however, that video decoders should not be expected to handle extreme fluctuations in coded resolution, (e.g., a change of resolution at every picture) without introducing some artifacts. In one example, according to the techniques herein, constraints may be introduced to prevent frequent resolution changes. In one example, the following constraint may be introduced, e.g., as a profile limit. The distance between a change in output format shall be at least one second (or half a second) in output, which may be formally expressed as:

When output format of picture n is different than the output format of the preceding picture in output order, then the output format of picture m shall be the same as the output format of picture n for all m with DpbOutputTime[m]−DpbOutputTime[n] less than one second.

Where, DpbOutputTime is a decoding picture buffer output time.

It should be noted that a different time limit may be chosen, such as one half second or 250 milliseconds. The limit could alternatively be expressed in number of pictures such as:

When output format of picture n is different than the output format of the preceding picture in output order, then the output format of picture m shall be the same as the output format of picture n for the next X pictures, following picture n in output order.

Where X is a specific value such as 15 or 31.

It should be noted that JVET-P2001 provides the following for a maximum DPB size:

When the specified level is not level 8.5, the value of max_dec_pic_buffering_minus1[Htid]+1 shall be less than or equal to MaxDpbSize, which is derived as follows:

```
if( PicSizeInSamplesY <= ( MaxLumaPs >> 2 ) )
    MaxDpbSize = Min( 4 * maxDpbPicBuf, 16 )
else if( PicSizeInSamplesY <= ( MaxLumaPs >> 1 ) )
    MaxDpbSize = Min( 2 * maxDpbPicBuf, 16 )
else if( PicSizeInSamplesY <= ( ( 3 * MaxLumaPs ) >> 2 ) )
    MaxDpbSize = Min( ( 4 * maxDpbPicBuf ) / 3, 16 )
else
    MaxDpbSize = maxDpbPicBuf
``` where MaxLumaPs is specified in Table 10. and maxDnbPicBuf is equal to 8.

TABLE 10

| Level | Max luma picture size MaxLumaPs (samples) | Max CPB size MaxCPB (CpbVclFactor or CpbNalFactor bits) | | Max slices per picture MaxSlicePerPicture | Max # of tile rows MaxTileRows | Max # of tile columns MaxTileCols |
| --- | --- | --- | --- | --- | --- | --- |
| | | Main tier | High tier | | | |
| 1 | 36 864 | 350 | — | 16 | 1 | 1 |
| 2 | 122 880 | 1 500 | — | 16 | 1 | 1 |
| 2.1 | 245 760 | 3 000 | — | 20 | 1 | 1 |
| 3 | 552 960 | 6 000 | — | 30 | 2 | 2 |
| 3.1 | 983 040 | 10 000 | — | 40 | 3 | 3 |
| 4 | 2 228 224 | 12 000 | 30 000 | 75 | 5 | 5 |
| 4.1 | 2 228 224 | 20 000 | 50 000 | 75 | 5 | 5 |
| 5 | 8 912 896 | 25 000 | 100 000 | 200 | 11 | 10 |
| 5.1 | 8 912 896 | 40 000 | 160 000 | 200 | 11 | 10 |
| 5.2 | 8 912 896 | 60 000 | 240 000 | 200 | 11 | 10 |
| 6 | 35 651 584 | 60 000 | 240 000 | 600 | 22 | 20 |
| 6.1 | 35 651 584 | 120 000 | 480 000 | 600 | 22 | 20 |
| 6.2 | 35 651 584 | 240 000 | 800 000 | 600 | 22 | 20 |

In one example, according to the techniques herein, in order to ensure that the number of DPB slots available for decoded pictures does not increase when pic_width_in_luma_samples and/or pic_height_in_luma_samples are less than pic_width_max_in_luma_samples and pic_height_max_in_luma_samples respectively, the process may be used for deriving MaxDpbSize:

PicSizeMaxInSamplesY=pic_width_max_in_luma_samples*pic_height_max_in_luma_samples When the specified level is not level 8.5, the value of max_dec_pic_buffering_minus1[Htid]+1 shall be less than or equal to MaxDpbSize, which is derived as follows:
if(PicSizeMaxInSamplesY<=(MaxLumaPs>>2))

MaxDpbSize=Min(4*maxDpbPicBuf,16)

else if(PicSizeMaxInSamplesY<=(MaxLumaPs>>1))

MaxDpbSize=Min(2*maxDpbPicBuf,16)

else if(PicSizeMaxInSamplesY<=((3*MaxLumaPs)>>2))

MaxDpbSize=Min((4*maxDpbPicBuf)/3,16)

else

MaxDpbSize=maxDpbPicBuf

In another example, PicSizeMaxInSamplesY may be derived as provided below. This may ensure that even at the transition from one CVS to another the number of pictures in the DPB cannot exceed the maximum that would have been allowed if all pictures were encoded at the intended display resolution.

PicSizeMaxInSamplesY=Max
(pic_width_max_in_luma_samples*pic_height_max_in_luma_samples,
intended_display_width_in_luma_samples*intended_display_height_in_luma_samples)

JVET-P2001 includes a restriction on picture height and width relative to the height and width of the reference pictures. In some cases, it may instead be desirable to apply the restriction to the width and height after the scaling window has been applied so as to ensure that the step size between the samples that are referenced is not too large. In one example, according to the techniques herein, the following restrictions to the width and height may be applied:
Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:
PicOutputWidthL*2 shall be greater than or equal to refPicOutputWidthL.
PicOutputHeightL*2 shall be greater than or equal to refPicOutputHeightL.
PicOutputWidthL shall be less than or equal to refPicOutputWidthL*8.
PicOutputHeightL shall be less than or equal to refPicOutputHeightL*8.
The variables PicOutputWidthL and PicOutputHeightL are derived as follows:

PicOutputWidthL=pic_width_in_luma_samples_(scaling_win_right_offset+scaling_win_left_offset)

PicOutputHeightL=pic_height_in_luma_samples_(scaling_win_bottom_offset+scaling_win_top_offset)

It should be noted that in one or more of the examples described herein, output format may be defined by the variables PicOutputWidthL and PicOutputHeightL. Further, output format may be defined by PicOutputWidthL, PicOutputHeightL, chroma_format_idc, separate_colour_plane_flag and bit_depth_minus8. Alternatively, the term "resolution" or "width and height" can be used instead of "format."

As provided above, JVET-P2001 includes the syntax element ref_pic_resampling_enabled_flag to specify if reference picture resampling may be used in the CVS or not. The constraints that are expressed related to ref_pic_resampling_enabled_flag may be unnecessary strict and prohibit some use cases that do not use reference picture resampling, such as, the case when the resolution is changed within a CVS, but where no prediction is performed between pictures of different resolutions. An improved way to express the constraint related to ref_pic_resampling_enabled_flag is as follows:

When ref_pic_resampling_enabled_flag is equal to 0, it is a requirement of bitstream conformance that PicOutputWidthL is equal to refPicOutputWidthL and that PicOutputHeightL is equal to refPicOutputHeightL.

In this manner, source device 102 represents an example of a device configured to signal a syntax element indicating an intended display width of each picture referring to a parameter set and signal a syntax element indicating an intended display height of each picture referring to the parameter set.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or subcomponents thereof. For example, video decoder 124 may be configured to output video data to any communication medium, as described herein.

Figure 8:
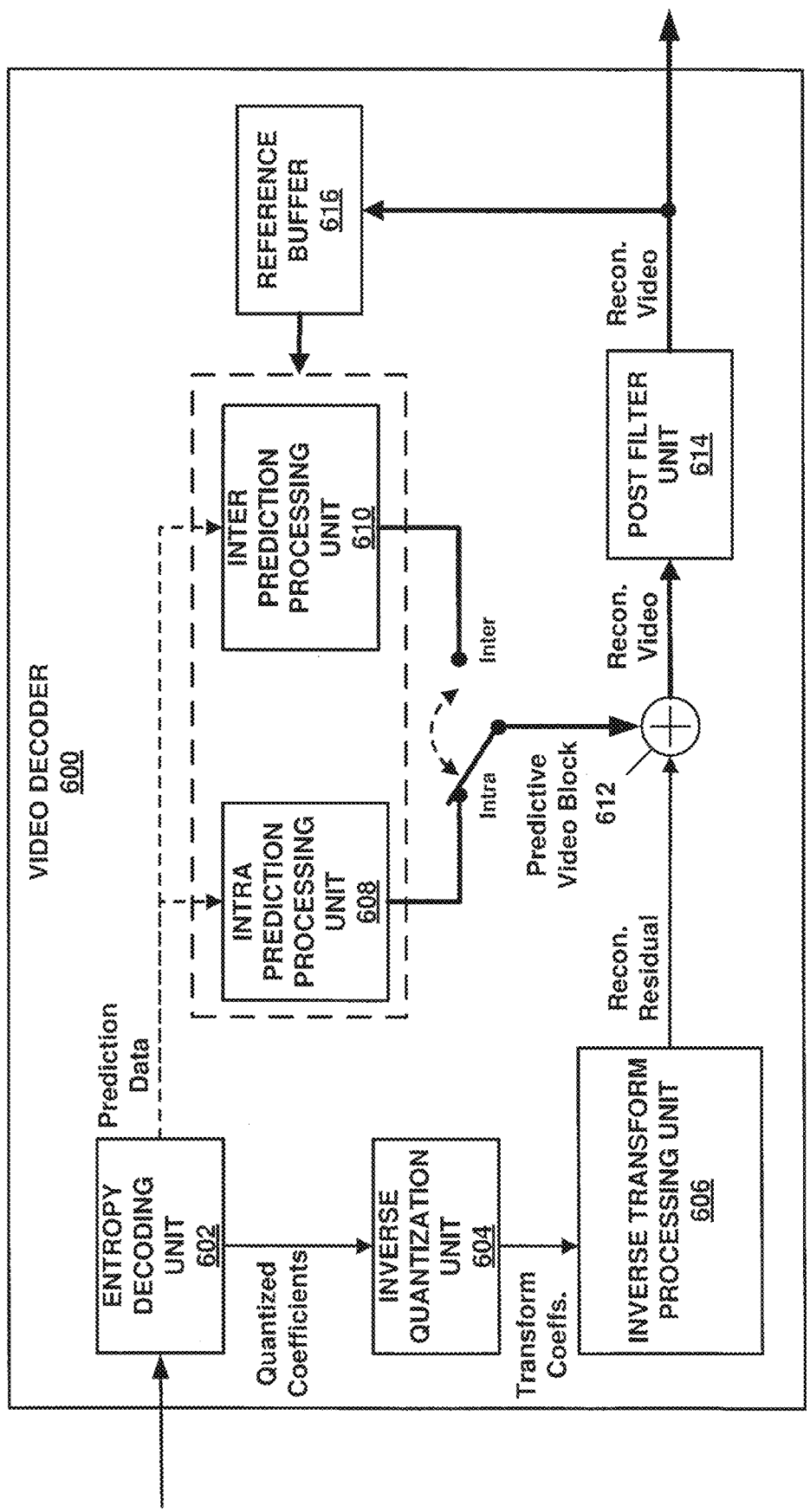
FIG. 8 is a block diagram illustrating an example of a video decoder that may be configured to decode video data according to one or more techniques of this disclosure.

FIG. 8 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-10. Video decoder 600 may decode a picture based on or according to the processes described above, and further based on parsed values in Tables 1-10.

In the example illustrated in FIG. 8, video decoder 600 includes an entropy decoding unit 602, inverse quantization unit 604, inverse transform coefficient processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 8, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 8, entropy decoding unit 602 may determine a quantization parameter, quantized coefficient values, transform data, and prediction data from a bitstream. In the example, illustrated in FIG. 8, inverse quantization unit 604 and inverse transform coefficient processing unit 606 receive a quantization parameter, quantized coefficient values, transform data, and prediction data from entropy decoding unit 602 and outputs reconstructed residual data.

Referring again to FIG. 8, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 8, a reconstructed video block may be output by video decoder 600. In this manner, video decoder 600 represents an example of a device configured to parse a syntax element indicating whether a reference picture list for a picture associated with a picture header is derived based on a reference picture list included in a sequence parameter set and conditionally parse a syntax element indicating an index value associated with a reference picture list included in the sequence parameter set based on the value of the syntax element indicating whether a reference picture list for picture associated with a picture header is derived based on a reference picture list included in a sequence parameter set.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of signaling output resolution for video data, the method comprising: signaling a syntax element indicating an intended display width of each picture referring to a parameter set; and signaling a syntax element indicating an intended display height of each picture referring to the parameter set.

In one example, a method of decoding video data, the method comprising: parsing a syntax element indicating an intended display width of each picture referring to a parameter set; and parsing a syntax element indicating an intended display height of each picture referring to the parameter set.

In one example, the method, wherein the syntax elements are included in a decoding parameter set.

In one example, the method, wherein the syntax elements are conditionally present in the parameter set based on the value of a flag.

In one example, a device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus comprising means for performing any and all combinations of the steps.

In one example, a non-transitory computer-readable storage medium comprising instructions stored thereon that, when executed, cause one or more processors of a device to perform any and all combinations of the steps.

In one example, a method of decoding video data, the method comprising: receiving a sequence parameter set; parsing a maximum width syntax element specifying a maximum width of each decoded picture referring to the sequence parameter set; parsing a maximum height syntax element specifying a maximum height of each decoded picture referring to the sequence parameter set; and parsing a first flag syntax element indicating whether conformance cropping window offset parameters are present in the sequence parameter set, wherein the conformance cropping window offset parameters specify a cropping window that is applied to pictures with a width equal to the maximum width and a height equal to the maximum height.

In one example, the method, further comprising: receiving a picture parameter set; parsing a width syntax element specifying a width of decoded picture referring to the picture parameter set; and parsing a height syntax element specifying a height of each decoded picture referring to the picture parameter set, wherein values of conformance cropping window offset parameters in the picture parameter set are inferred to be equal to values of the conformance cropping window offset parameters in the sequence parameter set, in a case that the width specified by the width syntax element is equal to the maximum width and the height specified by the height syntax element is equal to the maximum height.

In one example, the method, further comprising: parsing a second flag syntax element specifying whether the conformance cropping window offset parameters are present in the picture parameter set, wherein the values of the conformance cropping window offset parameters in the picture parameter set are inferred to be equal to 0, in a case that a value of the second flag syntax element is equal to 0.

In one example, the method, further comprising: parsing the conformance cropping window offset parameters, specifying samples of pictures in a CLVS that are output from a decoding process, in the picture parameter set.

In one example, a method of encoding image data, the method comprising: signaling a sequence parameter set, wherein: the sequence parameter set includes: (i) a maximum width syntax element specifying a maximum width of each decoded picture referring to the sequence parameter set, (ii) a maximum height syntax element specifying a maximum height of each decoded picture referring to the sequence parameter set, and (iii) a first flag syntax element indicating whether conformance cropping window offset parameters are present in the sequence parameter set, and the conformance cropping window offset parameters specify a cropping window that is applied to pictures with a width equal to the maximum width and a height equal to the maximum height.

In one example, a device comprising one or more processors configured to: receive a sequence parameter set; parse a maximum width syntax element specifying a maximum width of each decoded picture referring to the sequence parameter set; parse a maximum height syntax element specifying a maximum height of each decoded picture referring to the sequence parameter set; and parse a first flag syntax element indicating whether conformance cropping window offset parameters are present in the sequence parameter set, wherein the conformance cropping window offset parameters specify a cropping window that is applied to pictures with a width equal to the maximum width and a height equal to the maximum height.

CROSS REFERENCE

This Nonprovisional application claims priority under 35 U.S.C. § 119 on provisional Application No. 62/949,864 on Dec. 18, 2019, the entire contents of which are hereby incorporated by reference.

The invention claimed is:

1. A method of decoding video data, the method comprising:
receiving a sequence parameter set;
parsing a maximum width syntax element specifying a maximum width of each decoded picture referring to the sequence parameter set;
parsing a maximum height syntax element specifying a maximum height of each decoded picture referring to the sequence parameter set;
parsing a first flag syntax element having a value indicating sequence parameter set conformance cropping window offset syntax elements follow next in the sequence parameter set, wherein the first flag syntax element is 1-bit, unconditionally present, and immediately follows the maximum height syntax element in the sequence parameter set;
parsing the sequence parameter set conformance cropping window offset syntax elements, wherein the sequence parameter set conformance cropping window offset syntax elements specify a cropping window that is applied to pictures with a width equal to a maximum width and a height equal to a maximum height, and immediately follow the first flag syntax element in the sequence parameter set;
receiving a picture parameter set;
parsing a width syntax element specifying a width of each decoded picture referring to the picture parameter set;
parsing a height syntax element specifying a height of each decoded picture referring to the picture parameter set;
parsing a second flag syntax element having a value indicating picture parameter set conformance cropping window offset syntax elements follow next in the picture parameter set; and
parsing the picture parameter set conformance cropping window offset syntax elements; wherein
the picture parameter set conformance cropping window offset syntax elements specify a cropping window that is applied to pictures not satisfying a condition where the width is equal to the maximum width and the height is equal to the maximum height.

2. A device of encoding image data, the device comprising one or more processors configured to:
- signal a sequence parameter set, wherein the sequence parameter set includes:
  - (i) a maximum width syntax element specifying a maximum width of each decoded picture referring to the sequence parameter set,
  - (ii) a maximum height syntax element specifying a maximum height of each decoded picture referring to the sequence parameter set,
  - (iii) a first flag syntax element having a value indicating sequence parameter set conformance cropping window offset syntax elements follow next in the sequence parameter set, wherein the first flag syntax element is 1-bit, unconditionally present, and immediately follows the maximum height syntax element in the sequence parameter set, and
  - (iv) the sequence parameter set conformance cropping window offset syntax elements, wherein the sequence parameter set conformance cropping window offset syntax elements specify a cropping window that is applied to pictures with a width equal to a maximum width and a height equal to a maximum height, and immediately follow the first flag syntax element in the sequence parameter set, and
- signal a picture parameter set, wherein the picture parameter set includes:
  - (v) a width syntax element specifying the width of each decoded picture referring to the picture parameter set,
  - (vi) a height syntax element specifying the height of each decoded picture referring to the picture parameter set,
  - (vii) a second flag syntax element having a value indicating picture parameter set conformance cropping window offset syntax elements follow next in the picture parameter set, and
  - (viii) the picture parameter set conformance cropping window offset syntax elements, wherein the picture parameter set conformance cropping window offset syntax elements specify a cropping window that is applied to pictures not satisfying a condition where the width is equal to the maximum width and the height is equal to the maximum height.

3. A device comprising one or more processors configured to
- receive a sequence parameter set;
- parse a maximum width syntax element specifying a maximum width of each decoded picture referring to the sequence parameter set;
- parse a maximum height syntax element specifying a maximum height of each decoded picture referring to the sequence parameter set;
- parse a first flag syntax element having a value indicating sequence parameter set conformance cropping window offset syntax elements follow next in the sequence parameter set, wherein the first flag syntax element is 1-bit, unconditionally present, and immediately follows the maximum height syntax element in the sequence parameter set;
- parse the sequence parameter set conformance cropping window offset syntax elements, wherein the sequence parameter set conformance cropping window offset syntax elements specify a cropping window that is applied to pictures with a width equal to a maximum width and a height equal to a maximum height, and immediately follow the first flag syntax element in the sequence parameter set;
- receive a picture parameter set;
- parse a width syntax element specifying a width of each decoded picture referring to the picture parameter set;
- parse a height syntax element specifying a height of each decoded picture referring to the picture parameter set;
- parse a second flag syntax element having a value indicating picture parameter set conformance cropping window offset syntax elements follow next in the picture parameter set; and
- parse the picture parameter set conformance cropping window offset syntax elements; wherein
- the picture parameter set conformance cropping window offset syntax elements specify a cropping window that is applied to pictures not satisfying a condition where the width is equal to the maximum width and the height is equal to the maximum height.

* * * * *